(12) United States Patent
Jeong et al.

(10) Patent No.: US 12,064,082 B2
(45) Date of Patent: Aug. 20, 2024

(54) CLEANING ROBOT AND CONTROLLING METHOD THEREOF

(71) Applicant: Samsung Electronics Co., Ltd., Suwon-si (KR)

(72) Inventors: Jaeyoon Jeong, Suwon-si (KR); Minwoo Ryu, Suwon-si (KR); Donghun Lee, Suwon-si (KR); Shin Kim, Suwon-si (KR); Jeayun So, Suwon-si (KR); Jooseok Jeong, Suwon-si (KR); Changho Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 527 days.

(21) Appl. No.: 17/482,984

(22) Filed: Sep. 23, 2021

(65) Prior Publication Data
US 2022/0047139 A1  Feb. 17, 2022

Related U.S. Application Data

(63) Continuation of application No. PCT/KR2021/010472, filed on Aug. 9, 2021.

(30) Foreign Application Priority Data

Aug. 14, 2020  (KR) .......... 10-2020-0102244

(51) Int. Cl.
*A47L 9/28* (2006.01)
*A47L 11/24* (2006.01)
*G05D 1/00* (2024.01)

(52) U.S. Cl.
CPC .......... *A47L 9/2894* (2013.01); *A47L 9/2805* (2013.01); *A47L 9/2873* (2013.01); *A47L 11/24* (2013.01);
(Continued)

(58) Field of Classification Search
CPC .... G05D 1/00; G05D 1/02; G05D 3/00; B25J 9/16; B25J 9/10; A47L 11/00; A47L 9/28; A47L 9/30; G01B 11/00
See application file for complete search history.

(56) References Cited

U.S. PATENT DOCUMENTS 7,489,985 B2  2/2009  Ko et al.
9,340,116 B2  5/2016  Noiri
(Continued)

FOREIGN PATENT DOCUMENTS

CN  208808368 U  5/2019
JP  2019-197428 A  11/2019
(Continued)

OTHER PUBLICATIONS

International Search Report dated Nov. 24, 2021, issued in International Application No. PCT/KR2021/010472.

*Primary Examiner* — Tan Q Nguyen
(74) *Attorney, Agent, or Firm* — Jefferson IP Law, LLP

(57) ABSTRACT

A cleaning robot and a method of controlling the same, the cleaning robot performing docking by detecting light emitted from a docking station using a Lidar sensor or a light receiving element separately provided on a printed circuit board (PCB) of the Lidar sensor, and performing docking based on the number of light emitting elements of the docking station identified according to the detected light are provided. The cleaning robot includes a main body, a drive unit configured to move the main body, a Lidar sensor including a Lidar optical transmitter, a Lidar optical receiver, and the PCB to which the Lidar optical transmitter and the Lidar optical receiver are fixed and provided to be rotatable, a docking optical receiver fixed to the PCB and configured to receive light emitted from the docking optical transmitter of the docking station, and at least one processor
(Continued)

is configured to control the drive unit to be docked on the docking station based on light received by the docking optical receiver.

22 Claims, 14 Drawing Sheets

(52) U.S. Cl.
CPC ......... *G05D 1/0225* (2013.01); *G05D 1/0242* (2013.01); *A47L 2201/022* (2013.01); *A47L 2201/04* (2013.01)

(56) References Cited

U.S. PATENT DOCUMENTS

| | | | |
|---|---|---|---|
| 9,851,711 | B2 | 12/2017 | Yoo et al. |
| 10,019,013 | B2 | 7/2018 | Kwak et al. |
| 2006/0087273 | A1* | 4/2006 | Ko .................. G05D 1/0242 318/587 |
| 2007/0050086 | A1* | 3/2007 | Lim .................. G05D 1/0242 700/245 |
| 2010/0324736 | A1* | 12/2010 | Yoo .................. G05D 1/0225 398/201 |
| 2018/0188737 | A1* | 7/2018 | Won .................. G05D 1/0088 |
| 2020/0060491 | A1 | 2/2020 | Lin et al. |

FOREIGN PATENT DOCUMENTS

| | | |
|---|---|---|
| JP | 6655804 B2 | 2/2020 |
| JP | 2021-112408 A | 8/2021 |
| KR | 10-2006-0037008 A | 5/2006 |
| KR | 10-0645814 B1 | 11/2006 |
| KR | 10-2103291 B1 | 5/2020 |
| WO | 2019/054129 A1 | 3/2019 |

* cited by examiner

| DOCKING MODE | LIDAR SENSOR | | DOCKING OPTICAL RECEIVER |
|---|---|---|---|
| | LIDAR OPTICAL TRANSMITTER | LIDAR OPTICAL RECEIVER | |
| FIRST DOCKING MODE | ON/OFF | ON/OFF | ON |
| SECOND DOCKING MODE | OFF | ON | OFF |

CLEANING ROBOT AND CONTROLLING METHOD THEREOF

CROSS-REFERENCE TO RELATED APPLICATION(S)

This application is a continuation application, claiming priority under § 365(c), of an International application No. PCT/KR2021/010472, filed on Aug. 9, 2021, which is based on and claims the benefit of a Korean patent application number 10-2020-0102244, filed on Aug. 14, 2020, in the Korean Intellectual Property Office, the disclosure of which is incorporated by reference herein in its entirety.

TECHNICAL FIELD

The disclosure relates to a cleaning robot moving to a docking station by detecting a position of the docking station and a method of controlling the same.

BACKGROUND ART

A cleaning robot is a device sucking foreign substances, such as dust from the floor while automatically traveling an area to be cleaned without user's manipulation.

For recharging the cleaning robot, the cleaning robot needs to find a docking station and perform docking thereon. When a position of the docking station is not accurately identified, charging cannot proceed so that the cleaning robot may stop operation. Therefore, research has been conducted into a technology enabling the cleaning robot to accurately find the position of the docking station and perform docking.

As docking methods currently applied to cleaning robots, infrared (IR) sensor-based docking methods, Lidar pattern recognition-based docking methods, and image sensor-based docking methods have been used. However, normal docking of a cleaning robot is impossible according to these docking methods when the cleaning robot is located at a distant position from the docking station.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a cleaning robot detecting light emitted from a docking station using a Lidar sensor or a light receiving element separately provided on a printed circuit board (PCB) of the Lidar sensor and performing docking based on the number of the light emitting elements of the docking station identified by the detected light, and a method of controlling the same.

Technical Solution

Additional aspects will be set forth in part in the description which follows and, in part, will be apparent from the description, or may be learned by practice of the presented embodiments.

In accordance with an aspect of the disclosure, a cleaning robot is provided. The cleaning robot includes a main body, a drive unit configured to move the main body, a Lidar sensor including a Lidar optical transmitter, a Lidar optical receiver, and a printed circuit board (PCB) to which the Lidar optical transmitter and the Lidar optical receiver are fixed and provided to be rotatable, a docking optical receiver fixed to the PCB and configured to receive light emitted from a docking optical transmitter of a docking station, and at least one processor is configured to control the drive unit to be docked on the docking station based on light received by the docking optical receiver.

The docking optical receiver may receive light having a bandwidth different from that of the Lidar optical receiver of the Lidar sensor.

The docking optical receiver may be provided on one surface of the PCB opposite to the other surface on which the Lidar optical transmitter and the Lidar optical receiver are provided.

The at least one processor may determine the number of identified docking optical transmitters among a plurality of docking optical transmitters of the docking station based on light received by the docking optical receiver, and control the drive unit based on the determined number of docking optical transmitters.

In response to the determined number of the docking optical transmitters being one, the at least one processor may control the drive unit to travel in a direction toward the identified docking optical transmitter until the number of the identified docking optical transmitters becomes plural.

In response to the determined number of the docking optical transmitters being plural, the at least one processor may determine a distance and an angle between the cleaning robot and the docking station based on angles between the docking optical receiver and the plurality of docking optical transmitters, and control the drive unit to be docked on the docking station based on the determined distance and angle.

In response to the docking optical transmitter not being identified by the docking optical receiver, the at least one processor may control the drive unit to travel to a position of the docking station on a cleaning map until the docking optical transmitter is identified.

The cleaning robot may further include a docking terminal connected to a charging terminal of the docking station, wherein the at least one processor may control the drive unit to stop traveling in response to the docking terminal being connected to the charging terminal.

The cleaning robot may further include a communicator configured to communicate with the docking station, wherein the at least one processor may control the communicator to request the docking station to allow the docking optical transmitter to emit light in response to a docking mode being initiated.

In accordance with another aspect of the disclosure, a cleaning robot is provided. The cleaning robot includes a main body, a drive unit configured to move the main body, a Lidar sensor including a Lidar optical transmitter and a Lidar optical receiver, and at least one processor may be configured to control to Lidar sensor to turn off the Lidar optical transmitter, and control the drive unit to be docked on a docking station based on light emitted from a docking optical transmitter of the docking station and received by the Lidar optical receiver, in response to a docking mode being initiated.

The at least one processor may determine the number of the identified docking optical transmitters among a plurality of docking optical transmitters of the docking station based on light received by the Lidar optical receiver, and control the drive unit based on the determined number of docking optical transmitters.

In response to the determined number of the docking optical transmitters being one, the at least one processor may control the drive unit to travel in a direction toward the identified docking optical transmitter until the number of the identified docking optical transmitters becomes plural.

In response to the determined number of the docking optical transmitters being plural, the at least one processor may determine a distance and an angle between the cleaning robot and the docking station based on angles between the Lidar optical receiver and the plurality of docking optical transmitters, and control the drive unit to be docked on the docking station based on the determined distance and angle.

In response to the docking optical transmitter not being identified by the Lidar optical receiver, the at least one processor may control the drive unit to travel to a position of the docking station on a cleaning map until the docking optical transmitter is identified.

The cleaning robot may further include a docking terminal connected to a charging terminal of the docking station, wherein the at least one processor may control the drive unit to stop traveling in response to the docking terminal being connected to the charging terminal.

The cleaning robot may further include a communicator configured to communicate with the docking station, wherein the at least one processor may control the communicator to request the docking station to allow the docking optical transmitter to emit light in response to a docking mode being initiated.

In accordance with another aspect of the disclosure, a method of controlling a cleaning robot is provided. The method includes a main body, a drive unit configured to move the main body, and a Lidar sensor including a Lidar optical transmitter, a Lidar optical receiver, and a printed circuit board (PCB) to which the Lidar optical transmitter and the Lidar optical receiver are fixed and provided to be rotatable, the method including initiating supplying power to the docking optical receiver fixed to the PCB and configured to receive light emitted from the docking optical transmitter of the docking station in response to a docking mode being initiated, and controlling the drive unit to be docked on the docking station based on light received by the docking optical receiver.

The docking optical receiver may receive light having a bandwidth different from that of the Lidar optical receiver of the Lidar sensor.

The controlling of the drive unit may include determining the number of identified docking optical transmitters among a plurality of docking optical transmitters of the docking station based on light received by the docking optical receiver, and controlling the drive unit based on the determined number of the docking optical transmitters.

The controlling of the drive unit may include controlling the drive unit to travel in a direction toward the identified docking optical transmitter until the number of the identified docking optical transmitters becomes plural in response to the determined number of the docking optical transmitters being one, and controlling the drive unit to be docked on the docking station by determining a distance and an angle between the cleaning robot and the docking station based on angles between the docking optical receiver and the plurality of docking optical transmitters, in response to the determined number of the docking optical transmitters being plural.

Advantageous Effects

According to the cleaning robot and the method of controlling the same according to an embodiment of the disclosure, docking with the docking station located at a distant position may be performed more accurately by detecting light emitted from the docking station using the Lidar sensor or the light receiving element separately provided on the PCB of the Lidar sensor and performing docking based on the number of the light emitting elements of the docking station identified by the detected light.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 8 is a diagram for describing a docking mode in which a cleaning robot performs docking by receiving light emitted from a docking station according to an embodiment of the disclosure;

The same reference numerals are used to represent the same elements throughout the drawings.

MODES OF THE INVENTION

Figure 1:
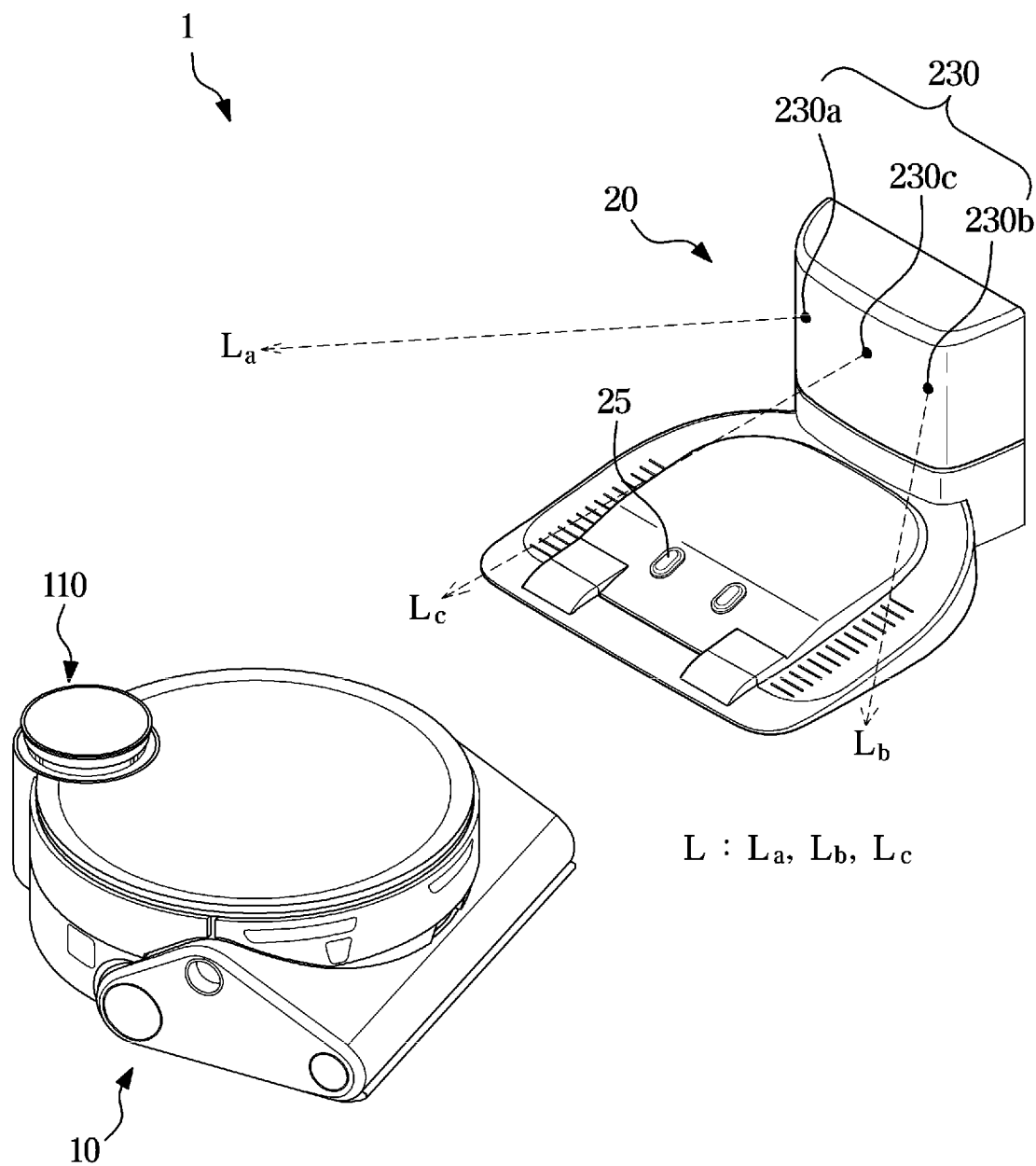
FIG. 1 is a diagram illustrating a cleaning robot docking system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when an element is referred to as being "connected to" another element, it may be directly or indirectly connected to the other element and the "indirectly connected to" includes connected to the other element via a wireless communication network.

In addition, the terms used in the specification are merely used to describe particular embodiments of the disclosure, and are not intended to limit the disclosure. In addition, it is to be understood that the terms, such as "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure.

In addition, the terms "unit", "device", "block, "member", and "module" used herein refer to a unit used to process at least one function or operation. For example, these terms may refer to one or more hardware components, such as field-programmable gate array (FPGA) or application specific integrated circuit (ASIC), one or more software components stored in a memory, or one or more processors.

The reference numerals used in operations are used for descriptive convenience and are not intended to describe the order of operations and the operations may be performed in a different order unless otherwise stated.

Hereinafter, embodiments of the disclosure will be described with reference to the accompanying drawings.

FIG. 1 is a diagram illustrating a cleaning robot docking system according to an embodiment of the disclosure.

Referring to FIG. 1, a cleaning robot docking system 1 according to an embodiment includes a cleaning robot 10 and a docking station 20.

The cleaning robot 10 may determine a position of the docking station 20 by detection light L (La, Lb, and Lc, e.g., infrared rays) emitted from the docking station 20 and move to the docking station 20 to perform docking.

To this end, the cleaning robot 10 may include a light receiving element provided at a printed circuit board (PCB) of a Lidar sensor 110 and capable of detecting light having a bandwidth different from that of the Lidar sensor 110 and may detect light emitted from the docking station 20 by the light receiving element.

In addition, the cleaning robot 10 may detect light emitted from the docking station 20 by using the Lidar sensor 110 according to an embodiment. In this case, the cleaning robot 10 may detect light emitted from the docking station 20 by turning on an optical receiver of the Lidar sensor 110 simultaneously turning off a laser of the Lidar sensor 110.

The docking station 20 may include a plurality of optical transmitters 230 (230a, 230b, and 230c) provided at a main body and the plurality of optical transmitters 230 may emit light L (e.g., infrared rays). For example, the plurality of optical transmitters 230 may be provided on a front surface of the main body of the docking station 20 and emit light L from the front surface of the docking station 20. In this case, the front surface of the main body is a surface on which the cleaning robot 10 is docked and a charging terminal 25 for docking with the cleaning robot 10 may be provided on the front surface of the main body. Although three optical transmitters 230 are illustrated in FIG. 1, the embodiment is not limited thereto. The number of the optical transmitters 230 is not particularly limited as long as two or more optical transmitters 230 are used.

The docking station 20 may include the charging terminal 25 capable of supplying power to a battery of the cleaning robot 10. The charging terminal 25 may correspond to an electrode and two charging terminals 25 may be provided as shown in FIG. 1. The cleaning robot 10 may include a docking terminal (not shown) to be in contact with the charging terminal 25 and the battery may be charged by receiving power from the charging terminal 25 through the docking terminal.

In the above, the cleaning robot docking system 1 has been described. Hereinafter, structural characteristics of the cleaning robot 10 that receives light L emitted from the docking station 20 will be described below.

Figure 2:
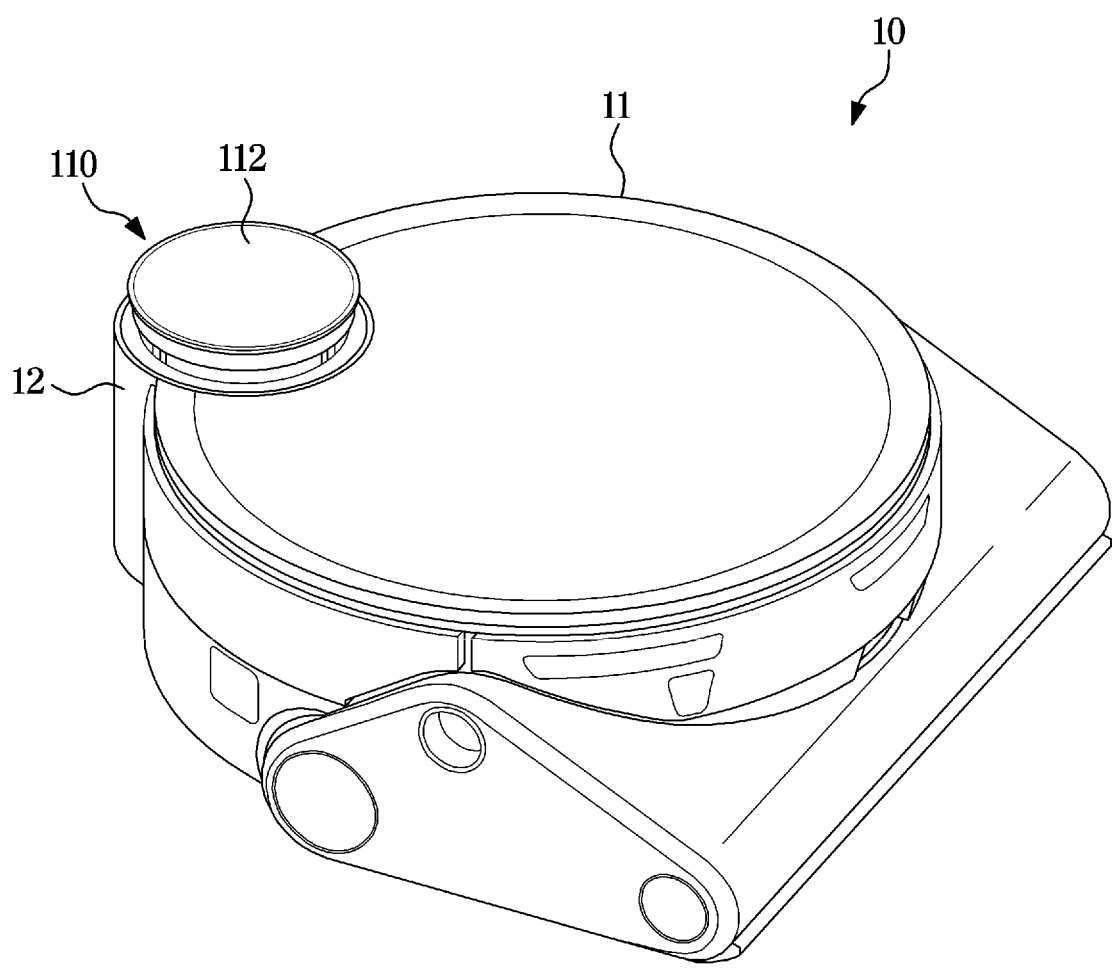
FIG. 2 is a diagram illustrating an appearance of a cleaning robot according to an embodiment of the disclosure.
Figure 3:
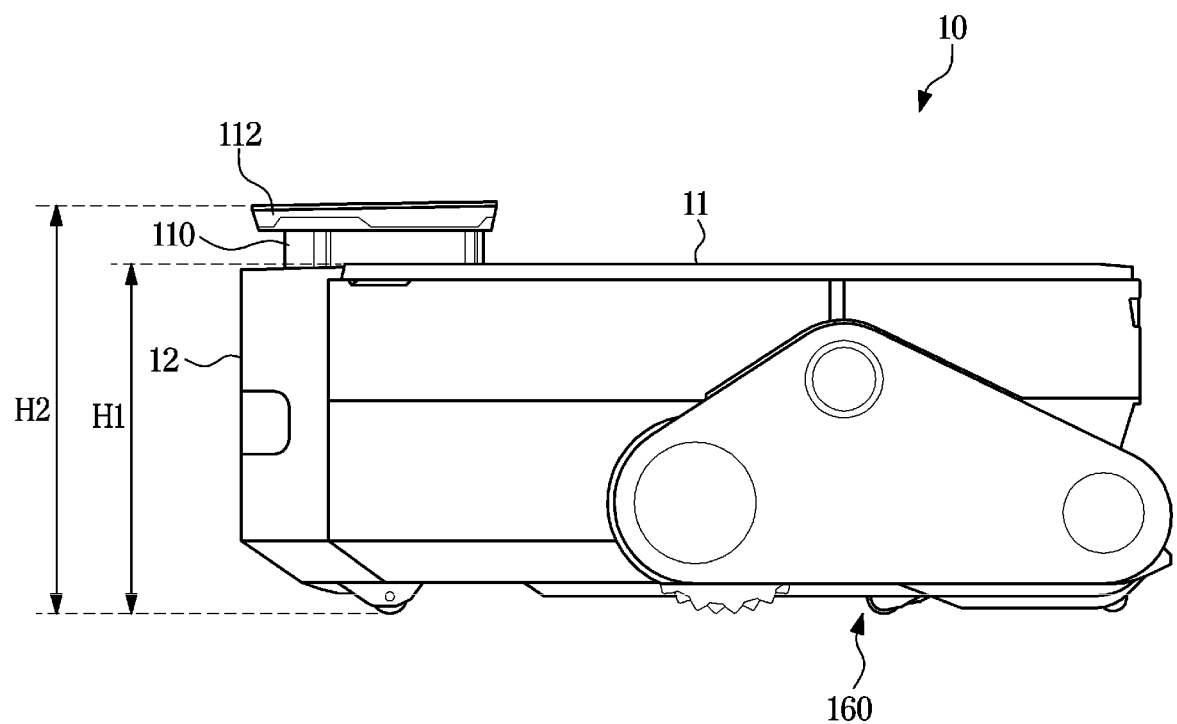
FIG. 3 is a diagram illustrating a side of a cleaning robot according to an embodiment of the disclosure.
Figure 4:
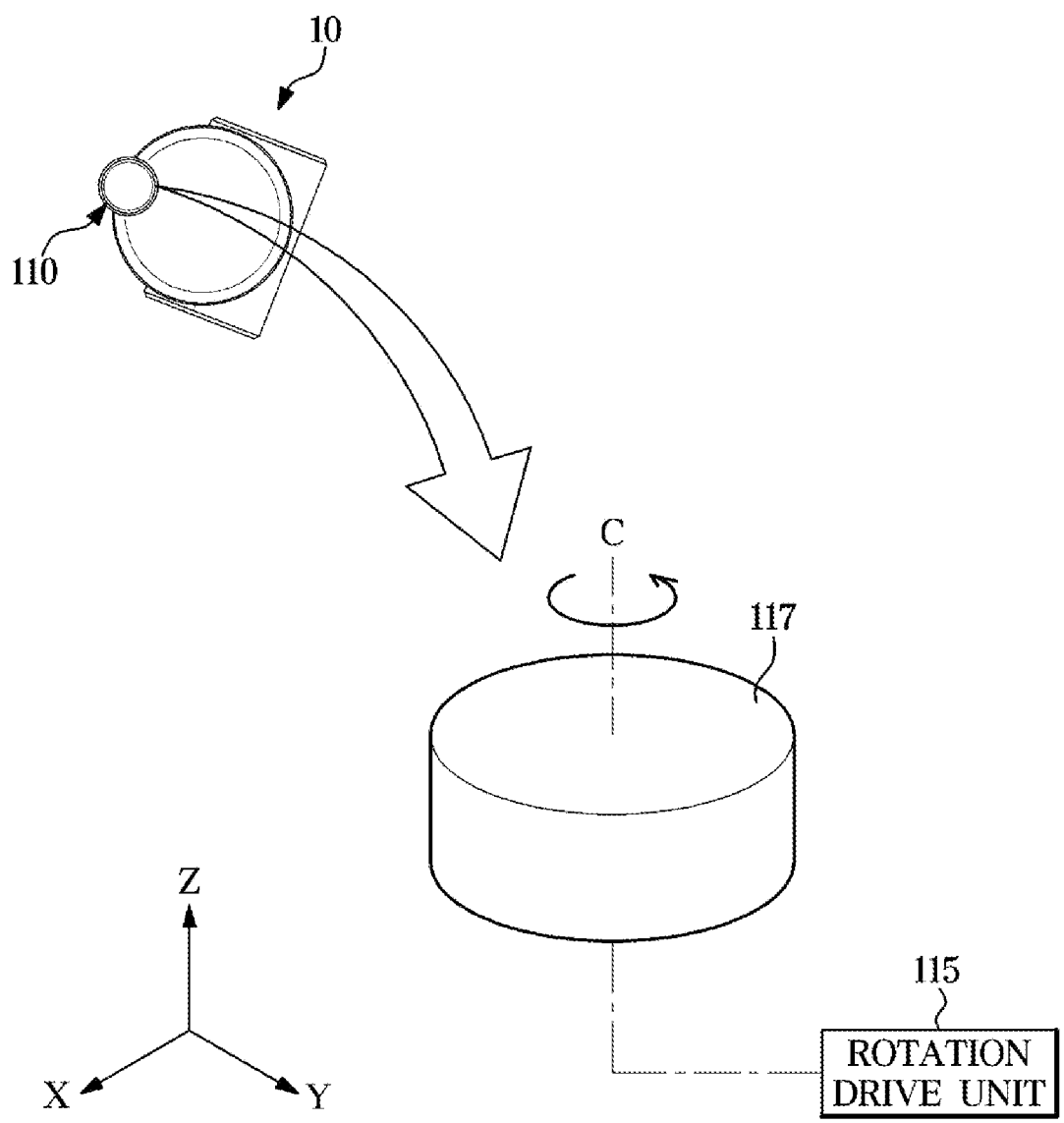
FIG. 4 is a diagram illustrating a Lidar sensor of a cleaning robot according to an embodiment of the disclosure.
Figure 5:
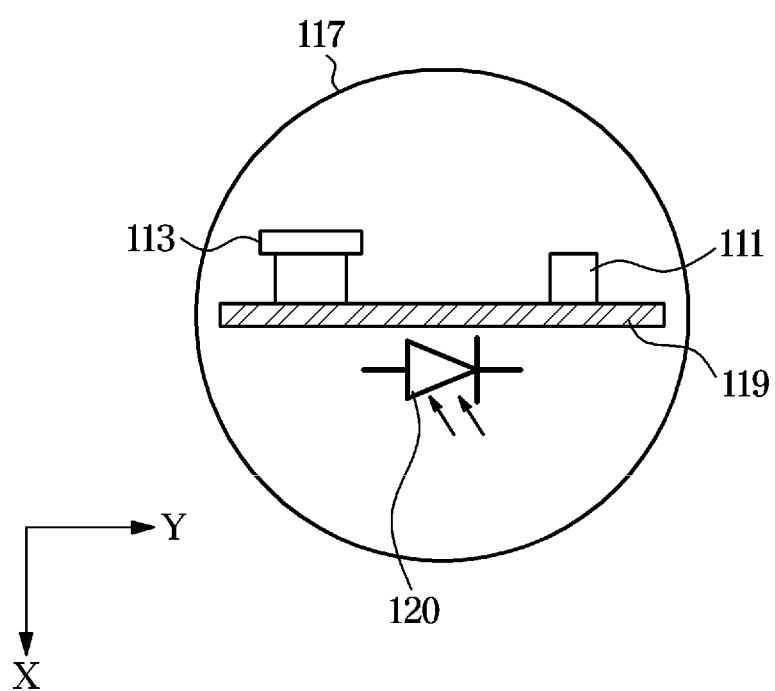
FIG. 5 is a diagram illustrating a docking optical receiver of a cleaning robot according to an embodiment of the disclosure.

FIG. 2 is a diagram illustrating an appearance of a cleaning robot according to an embodiment of the disclosure. FIG. 3 is a diagram illustrating a side of a cleaning robot according to an embodiment of the disclosure. FIG. 4 is a diagram illustrating a Lidar sensor of a cleaning robot according to an embodiment of the disclosure. FIG. 5 is a diagram illustrating a docking optical receiver of a cleaning robot according to an embodiment of the disclosure.

Referring to FIGS. 2 and 3, the cleaning robot 10 according to various embodiments may include a main body 11 and a rear cover both defining an appearance of the cleaning robot 10, a drive unit 160 for driving the cleaning robot 10, a Lidar sensor 110, and an upper cover covering the top of the Lidar sensor 110.

The Lidar sensor 110 may be disposed on the main body 11 and provided to be elevated and lowered between a first position and a second position which are located at different heights.

Referring to FIG. 3, a height H1 of the Lidar sensor 110 at the first position is greater than a height H2 of the Lidar sensor 110 at the second position with respect to the ground where the cleaning robot 10 is located.

For example, the Lidar sensor 110 may be provided to be inserted into the main body 11 or to protrude from the main body 10. When the Lidar sensor 110 is inserted into the main body 11, the Lidar sensor 110 may be located at the first position and when the Lidar sensor 110 protrudes from the main body 11, the Lidar sensor 110 may be located at the second position.

When inserted into the main body 11, the Lidar sensor 110 does not operate. However, when the rear cover 12 is formed of a transparent material, the Lidar sensor 110 operates even in the state of being inserted into the main body 11, thereby enabling detection for the rear area of the cleaning robot 10.

The height of the Lidar sensor 110 may be controlled in accordance with the situation.

The drive unit 160 according to an embodiment may include drive wheels provided at left and right sides. For example, the drive wheels may include a left drive wheel provided on the left side of the main body 11 and a right drive wheel provided on the right side of the main body 11.

In this case, the main body 11 may move forward or backward and rotate in accordance with rotation of the drive wheels. For example, when both the left and right drive wheels rotate forward, the main body 11 may linearly move forward. When both the left and right drive wheels rotate backward, the main body 11 may linearly move backward.

In addition, when the left and right drive wheels rotate in the same direction but at different speeds, the main body 11 may move in a curve. When the left and right drive wheels rotate in different directions, the main body 11 may turn left or right at a fixed position.

In addition, the cleaning robot 10 may further include a caster wheel provided at the bottom surface of the main body 11. The caster wheel is installed at the bottom surface of the main body 11 and rotates in accordance with a moving direction of the main body 11 to assist the main body 11 to move in a stable posture.

Referring to FIGS. 4 and 5, the cleaning robot 10 may include the Lidar sensor 110 capable of detecting an external object (obstacle).

The cleaning robot 10 may perform cleaning while traveling an area to be cleaned. When the Lidar sensor 110 detects an obstacle, the cleaning robot 10 may avoid or climb the detected obstacle.

The obstacle detected by the Lidar sensor 110 may refer all objects that interrupt traveling of the cleaning robot 10 in a state protruding or recessed from the floor, walls, or the ceiling of the area to be cleaned. For example, an object located in a traveling path of the cleaning robot 10, i.e., in an area to be cleaned, may be considered as an obstacle of the cleaning robot 10.

For example, as well as furniture, such as a table and a sofa located in the area to be cleaned, walls partitioning the space may also be considered as obstacles and any objects ascended or descended by the cleaning robot 10, such as a carpet, a threshold, and a round bar may also be considered as obstacles. In addition, objects that are not fixedly positioned in the area to be cleaned, e.g., a glass, a bowl, and a bag may be considered as obstacles to be avoided or ascended by the cleaning robot 10.

Whether the cleaning robot 10 avoids or ascends a detected obstacle may be determined based on a size of the obstacle and the size of the obstacle may be determined by at least one of a height, a width, and a depth thereof.

The Lidar sensor 110 may include a Lidar optical transmitter 111 configured to emit light, a Lidar optical receiver 113 configured to receive light reflected by an obstacle in a predetermined direction when light emitted from the Lidar optical transmitter 111 is reflected by the obstacle, and a printed circuit board (PCB) 119 to which the Lidar optical transmitter 111 and the Lidar optical receiver 113 are fixed. In this regard, the PCB 119 is provided on a support plate 117 rotated by a rotation drive unit 115 to rotate by 360 degrees in the clockwise or counterclockwise direction.

For example, the support plate 117 may rotate about an axis C in accordance with a power received from the rotation drive unit 115. Because fixed to the PCB 119, the Lidar optical transmitter 111 and the Lidar optical receiver 113 are provided to rotate by 360 degrees in the clockwise or counterclockwise direction by the rotation of the PCB 119. Therefore, the Lidar sensor 110 may detect obstacles in all directions by emitting and receiving light while rotating 360 degrees.

The Lidar optical transmitter 111 is a component configured to emit light (e.g., infrared laser beams) and may be provided in singular or plural according to an embodiment.

When light emitted from the Lidar optical transmitter 111 is reflected by the obstacle, the Lidar optical receiver 113 is provided to receive light in a predetermined direction among the reflected light. An output signal generated upon receiving light by the Lidar optical receiver 113 may be provided to a process of detecting an obstacle performed by a controller (not shown).

The Lidar optical receiver 113 may include a condenser configured to condense light received thereby and an optical sensor configured to detect light. According to an embodiment of the disclosure, the Lidar optical receiver 113 may include an amplifier configured to amplify light detected by the optical sensor.

The optical sensor may convert light into an electrical signal and transmit the converted signal to the controller. The optical sensor may include a photodiode, a photodiode array, a charge coupled device (CCD) sensor, a complementary metal-oxide semiconductor (CMOS) sensor, a cadmium sulfide (CDS) sensor, or the like. However, examples of the available optical sensor are not limited thereto.

The support plate 117 may be provided to be rotatable by the rotation drive unit 115. The rotation drive unit 115 may include an encoder (not shown), and the encoder may provide information on rotation angle of the support plate 117 to a process of detecting an obstacle performed by the controller. The information on rotation angle of the support plate 117 received from the encoder may include information on direction of the obstacle. The controller may detect the obstacle based on the information of rotation angle of the support plate 117 received from the encoder of the rotation drive unit 115 and the electrical signal output from the Lidar optical transmitter 111 and the Lidar optical receiver 113.

The PCB 119 may be provided on the support plate 117 to be rotatable together with the support plate 117 and provided with the Lidar optical transmitter 111 and the Lidar optical receiver 113 on one surface thereof. In this regard, the Lidar optical transmitter 111 and the Lidar optical receiver 113 may be located on the PCB 119 at different heights in the vertical direction (Z-axis) or at the same height in the vertical direction (Z-axis).

In this case, a docking optical receiver 120 may further be provided at the PCB 119. For example, the docking optical receiver 120 may be provided on the PCB 119 of the Lidar sensor 110 to be rotatable together with the PCB 119. When a docking mode is initiated, the docking optical receiver 120 may detect a position of the docking station 20 by receiving light L emitted from the docking optical transmitter 230 of the docking station 20 while rotating together with the PCB 119. In other words, the cleaning robot 10 may be docked on the docking station 20 based on light emitted from the docking optical transmitter 230 and received by the docking optical receiver 120.

Referring to FIG. 5, the docking optical receiver 120 may be provided on a surface opposite to the surface on which the Lidar optical transmitter 111 and the Lidar optical receiver 113 are provided between the surfaces of the PCB 119. However, the position of the docking optical receiver 120 is not limited to the above-described example as long as the docking optical receiver 120 is rotatable together with the PCB 119.

The docking optical receiver 120 may include a condenser configured to condense light received thereby and an optical sensor configured to detect the received light. According to an embodiment of the disclosure, the docking optical receiver 120 may also include an amplifier configured to amplify light detected by the optical sensor.

The optical sensor may convert light into an electrical signal and transmit the converted signal to the controller. The optical sensor may include a photodiode, a photodiode array, a charge coupled device (CCD) sensor, a complementary metal-oxide semiconductor (CMOS) sensor, a cadmium sulfide (CDS) sensor, or the like. However, examples of the available optical sensor are not limited thereto.

In this case, the docking optical receiver 120 may receive light having a bandwidth different from that of the Lidar optical receiver 113 of the Lidar sensor 110. For example, the bandwidth of light that is emitted and received between the Lidar optical transmitter 111 and the Lidar optical receiver 113 may be allocated to be different from the bandwidth of light that is emitted and received between the docking optical transmitter 230 of the docking station 20 and the docking optical receiver 120 of the cleaning robot 10.

Meanwhile, docking with the docking station 20 may be performed based on light received by the Lidar optical receiver 113 of the Lidar sensor 110 without using the docking optical receiver 120 according to another embodiment. In this case, the cleaning robot 10 may or may not include the docking optical receiver 120 and may receive light emitted from the docking optical transmitter 230 by turning on only the Lidar optical receiver 113 in a state where the Lidar optical transmitter 111 is turned off.

The operation of docking with the docking station 20 by receiving light emitted from the docking optical transmitter 230 will be described below.

Meanwhile, a Lidar sensor 110 according to another embodiment may include a Lidar optical transmitter 111 and a Lidar optical receiver 113 provided at fixed positions without rotating and a rotating polygonal mirror (not shown) or a rotating mirror (not shown) rotated by a rotation drive unit 115. In this case, light emitted from the Lidar optical transmitter 111 may radiate in all directions via the rotating polygonal mirror or rotating mirror, and light reflected by an obstacle may be received by the Lidar optical receiver 113 via the rotating polygonal mirror or rotating mirror. In this case, the docking optical receiver 120 may be provided on the same surface where the Lidar optical transmitter 11 and the Lidar optical receiver 113 are provided and receive light emitted from the docking optical transmitter 230 of the docking station 20 via the rotating polygonal mirror or rotating mirror.

The structural characteristics of the cleaning robot 10 that receives light L emitted from the docking station 20 have been described above. Hereinafter, a control flow of docking of the cleaning robot 10 on the docking station 20 will be described below.

Figure 6:
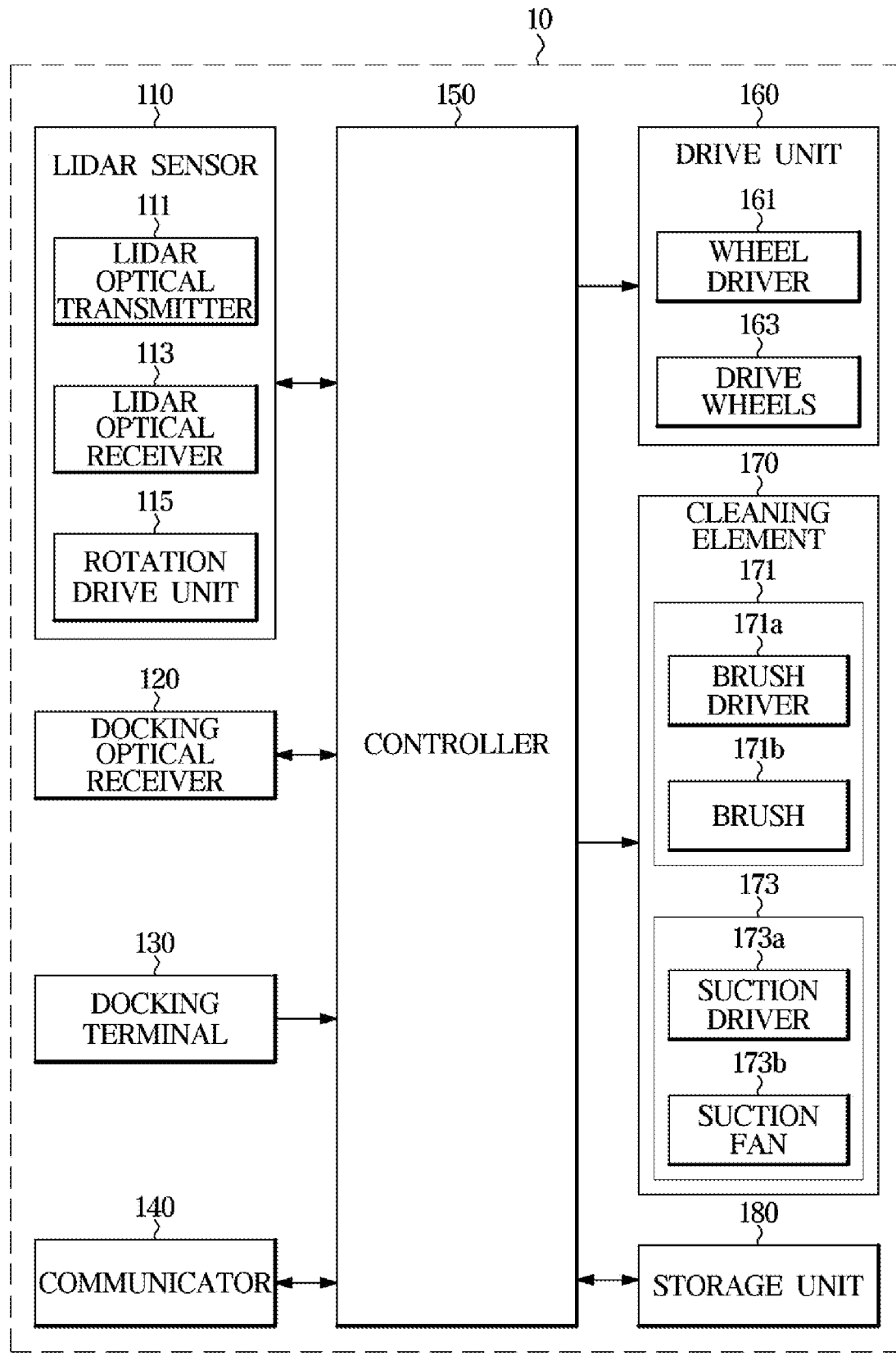
FIG. 6 is a control block diagram of a cleaning robot according to an embodiment of the disclosure.

FIG. 6 is a control block diagram of a cleaning robot according to an embodiment of the disclosure.

Referring to FIG. 6, the cleaning robot 10 according to an embodiment includes a Lidar sensor 110 configured to detect an external object (obstacle), a docking optical receiver 120 configured to detect light L emitted from the docking optical transmitter 230 of the docking station 20, a docking terminal 130 for docking on the docking station 20, a communicator 140 configured to perform communication with the docking station 20, a controller 150 configured to perform docking on the docking station 20, a drive unit 160 configured to move the main body 11, a cleaning element 170 configured to perform cleaning by scattering dust on the floor while traveling and sucking the scattered dust, and a storage unit 180 to store various information required for the control.

At least one component may be added or deleted in accordance with performance of the components of the cleaning robot 10 illustrated in FIG. 6. In addition, it will be readily understood by those skilled in the art that mutual positions of the components may be changed to correspond to performance or structure of a system.

The Lidar sensor 110 includes a Lidar optical transmitter 111 configured to radiate light toward external objects, a Lidar optical receiver 113 configured to receive light reflected by the external objects, and a rotation drive unit 115 configured to transfer a rotational force to a support plate 117 provided with the Lidar optical transmitter 111 and the Lidar optical receiver 113.

The Lidar sensor 110 may control the rotation drive unit 115 to transmit the rotational force to the support plate 117 in accordance with the control of the controller 150. In this case, the support plate 117 may rotate at a constant angular velocity and the PCB 119 fixed to the support plate 117 may also rotate at a constant angular velocity. Therefore, the Lidar optical transmitter 111 and the Lidar optical receiver 113 may receive light in a state of rotating at a constant angular velocity so that external objects may be identified in the range of 360 degrees.

In addition, the Lidar sensor 110 may receive light L emitted from the docking station 20 by turning off the Lidar optical transmitter 111 and turning on only the Lidar optical receiver 113 in accordance with the control of the controller 150 in a docking mode for performing docking of the cleaning robot 10. In the docking mode, the rotation drive unit 115 may continuously operate to transmit the rotational force to the support plate 117.

In this case, the Lidar sensor 110 may transmit output information indicating that a higher intensity of light is received in a direction where the docking station 20 is located to the controller 150 and the controller 150 may identify the direction where the docking station 20 is located based on the output information of the Lidar sensor 110. For example, the controller 150 may identify an angle between the Lidar sensor 110 and the docking optical transmitter 230 of the docking station 20 based on the output information of the Lidar sensor 110.

The docking optical receiver 120 may be provided on the PCB 119 of the Lidar sensor 110 and receive light emitted from the docking optical transmitter 230 of the docking station 20. For example, the docking optical receiver 120 may receive light L radiated in the range of 360 degrees while rotating at a constant angular velocity together with the PCB 119 of the Lidar sensor 110. In this case, the docking optical receiver 120 may transmit output information indicating a higher intensity of light is received in the direction where the docking station 20 is located to the controller 150 and the controller 150 may identify the direction where the docking station 20 is located based on the output information of the docking optical receiver 120. For example, the controller 150 may identify an angle between the docking optical receiver 120 and the docking optical transmitter 230 of the docking station 20 based on output information of the docking optical receiver 120.

The docking optical receiver 120 may receive light having a bandwidth different from that of the Lidar optical receiver 113 of the Lidar sensor 110. For example, the bandwidth of light that is emitted and received between the Lidar optical transmitter 111 and the Lidar optical receiver 113 may be allocated to be different from the bandwidth of light that is emitted and received between the docking optical transmitter 230 of the docking station 20 and the docking optical receiver 120 of the cleaning robot 10. Thus, the docking optical receiver 120 may more accurately identify the docking station 20 by inhibiting generation of noise caused by reflected light even when light is emitted from the Lidar optical transmitter 111 while the Lidar sensor 110 operates.

The docking optical receiver 120 may be turned on when the docking mode is initiated under the control of the controller 150 according to an embodiment. For example, when the docking mode is turned on, the controller 150 may initiate supplying of power to the docking optical receiver 120.

The docking terminal 130 may receive power from the charging terminal 25 of the docking station 20 when brought into contact with the charging terminal 25. In this case, when the supplying of power to the docking terminal 130 is initiated, the controller 150 may determine that the cleaning robot 10 is docked on the docking station 20 to end the docking mode and stop the operation of the drive unit 160. In this case, the docking terminal 130 may include a separate sensor (e.g., a voltage sensor and a current sensor) and inform the controller 150 of supplying of power when the power is received from the charging terminal 25.

For example, the cleaning robot 10 may include the docking terminal 130 configured to receive power when brought into contact with the charging terminal 25 of the docking station 20 at the bottom surface of the main body 11. The docking terminal 130 may correspond to an electrode and two docking terminals 130 may be provided. The cleaning robot 10 may charge a battery upon receiving the power from the charging terminal 25 via the docking terminal 130. However, the position and number of the docking terminal 130 may vary according to an embodiment without limitation as long as the power is received from the docking station 20.

When the docking mode is initiated, the communicator 140 may transmit a message requesting for turning on the docking optical transmitter 230 to the docking station 20 under the control of the controller 150. Accordingly, when the docking mode of the cleaning robot 10 is initiated, the docking station 20 turns on the docking optical transmitter 230 to emit light L. To this end, the communicator 140 may be provided as a wireless communication module that transmits/receives data via well-known wireless communication protocols.

Upon occurrence of a docking event, the controller 150 may initiate the docking mode. For example, the docking event may include an even in which a charge amount of the battery of the cleaning robot 10 decreases below a preset value, an event in which a docking instruction is input from a user via an input unit (not shown), an event in which a preset time elapses after initiation of a cleaning mode in which the cleaning robot 10 performs cleaning while traveling, and the like.

Upon initiation of the docking mode according to an embodiment of the disclosure, the controller 150 may control the communicator 140 to transmit a message requesting for turning on the docking optical transmitter 230 to the docking station 20. However, when the docking station 20 identifies the docking event and the docking optical transmitter 230 is automatically turned on according to an embodiment of the disclosure, the process of transmitting the request message to the docking station 20 may be omitted.

When the docking mode is initiated, the controller 150 may control the drive unit 160 to be docked on the docking station 20 based on light received by the docking optical receiver 120 from the docking station 20.

Specifically, the controller 150 may determine the number of identified docking optical transmitters 230 among the plurality of docking optical transmitters 230 based on light received by the docking optical receiver 120 from the docking optical transmitter 230 and control the drive unit 160 based on the determined number of the docking optical transmitters 230.

When the determined number of the docking optical transmitters 230 is one, the controller 150 may control the drive unit 160 to travel in a direction toward the identified docking optical transmitter 230 until the number of the identified docking optical transmitters 230 becomes plural.

When the determined number of the docking optical transmitters 230 is plural, the controller 150 may determine a distance and an angle between the cleaning robot 10 and the docking station 20 based on angles between the docking optical receiver 120 and the plurality of docking optical transmitters 230 and control the drive unit 160 to be docked on the docking station 20 based on the determined distance and angle.

As such, when a plurality of docking optical transmitters 230 are identified, the controller 150 may determine the angles between the docking optical receiver 120 and the plurality of docking optical transmitters 230 and the distance and the angle between the cleaning robot 10 and the docking station 20 may be determined based on the angles between the docking optical receiver 120 and the plurality of docking optical transmitters 230, and distances between a docking position of the docking station 20 and the plurality of docking optical transmitters 230, so that more accurate docking may be performed.

For example, the controller 150 may proceed traveling in a direction where the identified docking optical transmitter 230 is located until a plurality of docking optical transmitters 230 are identified to determine the distance and the angle between the cleaning robot 10 and the docking station 20.

In other words, the cleaning robot 10 may identify the number of the docking optical transmitters 230 as one when light L is received from only one docking optical transmitter 230 due to a relative position with the docking station 20 or when light L received from a plurality of docking optical transmitters 230 is not distinguished due to a relative position with the docking station 20 and a resolution of the docking optical receiver 120. The fact that only one docking optical transmitter 230 is identified indicates that the cleaning robot 10 is too far from the docking station 20 for docking or the angle therebetween is not suitable for docking. Therefore, the cleaning robot 10 may continue traveling in a direction toward the identified docking optical transmitter 230 until the number of the identified docking optical transmitters 230 becomes plural to be located in front of the docking station 20 to identify the plurality of docking optical transmitters 230.

Meanwhile, when the cleaning robot 10 receives light emitted from the docking optical transmitter 230 via the Lidar optical receiver 113 of the Lidar sensor 110 without using the docking optical receiver 120 according to another embodiment of the disclosure, the controller 150 may control the drive unit 160 to be docked on the docking station 20 based on light emitted from the docking station 20 and received by the Lidar optical receiver 113.

In this case, when the docking mode is initiated, the controller 150 may control the Lidar sensor 110 to turn off the Lidar optical transmitter 111. Thus, emission of the light from the Lidar optical transmitter 111 is prevented, so that generation of noise caused by reflection of light emitted from the Lidar optical transmitter 111 may be inhibited.

Specifically, the controller 150 may determine the number of identified docking optical transmitters 230 among the plurality of docking optical transmitters 230 of the docking station 20 based on light emitted from the docking optical transmitters 230 and received by the Lidar optical receiver 113 and control the drive unit 160 based on the determined number of the docking optical transmitters 230.

When the number of the identified docking optical transmitters 230 is one, the controller 150 may control the drive unit 160 to travel in a direction toward the identified docking optical transmitter 230 until the number of the identified docking optical transmitters 230 become plural.

When the determined number of the docking optical transmitters 230 is plural, the controller 150 may determine a distance and an angle between the cleaning robot 10 and the docking station 20 based on angles between the Lidar optical receiver 113 and the plurality of docking optical transmitters 230 and control the drive unit 160 to be docked on the docking station 20 based on the determined distance and angle.

As such, the cleaning robot 10 may perform docking in one docking mode selected from a first docking mode in which the docking is performed based on light L received by the docking optical receiver 120 and a second docking mode in which the docking is performed based on light L received by the Lidar optical receiver 113 of the Lidar sensor 110 according to an embodiment.

As described above, the cleaning robot 10 may also perform docking even when the docking station 20 is located at a distant position by performing docking using the Lidar sensor 110.

In addition, the cleaning robot 10 does not necessarily include an optical sensor to receive light emitted from the docking station 20 by performing docking using the Lidar sensor 110.

Specifically, cleaning robots of the related art need to include a plurality of light receiving sensors provided at different directions to receive light emitted from a docking station. For example, the cleaning robots should include a plurality of light receiving sensors oriented in different directions to receive light to identify the direction toward the docking station.

The cleaning robot 10 of the disclosure does not need to include a plurality of light receiving sensors because light emitted from the docking station 20 is received using the Lidar sensor 110. For example, because the cleaning robot 10 may identify the position of light emitted from the docking station 20 by using the docking optical receiver 120 provided at the Lidar sensor 110 and rotating together with the Lidar optical receiver 113 of the Lidar sensor 110 (first docking mode) or using the Lidar optical receiver 113 of the Lidar sensor 110 (second docking mode), there is no need for a plurality of light receiving sensors oriented in different directions to receive light.

Therefore, the cleaning robot 10 of the disclosure may reduce costs for materials used to form the light receiving sensors and lower energy consumption resulting from the operation of the light receiving sensors.

When the docking optical transmitter 230 is not identified by the docking optical receiver 120 or the Lidar optical receiver 113 in the first docking mode or the second docking mode, the controller 150 may control the drive unit 160 to travel toward the position of the docking station 20 on a cleaning map until the docking optical transmitter 230 is identified.

For example, the cleaning robot 10 may store the cleaning map and mark a position of the docking station 20 on the cleaning map when the cleaning robot 10 leaves from the docking station 20. When the cleaning robot 10 cannot identify light L emitted from the front surface of the docking station 20 due to a distance from or an angle with the docking station 20, the cleaning robot 10 may travel to the position of the docking station 20 on the cleaning map first so as to move to the front surface of the docking station 20 to identify the light L. Therefore, the cleaning robot 10 may be docked on the docking station 20 accurately even when the cleaning robot 10 is located at a distant position from the docking station 20.

When the docking terminal 130 of the cleaning robot 10 is connected to the charging terminal 25 of the docking station 20, the controller 150 may control the drive unit 160 to stop traveling. For example, when the operation of supplying power is confirmed by the sensor of the docking terminal 130, the cleaning robot 10 may determine that docking is completed and stop the operation of the drive unit 160.

When the docking mode is initiated, the controller 150 may determine a traveling angle of the cleaning robot 10 based on output information of the docking optical receiver 120 or the Lidar optical receiver 113 and control the drive unit 160 to perform docking by traveling at the traveling angle.

The drive unit 160 may include drive wheels 163 respectively provided on the left and right sides of the main body 11 and a wheel driver 161 to provide the power to the drive wheels 163 and the wheel driver 161 may include a wheel motor and a driving circuit.

For example, the controller 150 may transmit a control signal to the wheel driver 161 to move the main body 11 at the traveling angle determined based on the output information of the docking optical receiver 120 or the Lidar optical receiver 113.

When the cleaning mode is initiated, the controller 150 may control the cleaning element 170 to perform cleaning while traveling by scattering dust on the floor and sucking the scattered dust, simultaneously controlling the drive unit 160 to travel.

The cleaning element 170 may include a brush module 171 configured to scatter foreign substances, such as dust on the floor of the area to be cleaned and a suction module 173 configured to suck the scattered foreign substances. The brush module 171 includes a brush 171b rotating to scatter the foreign substances on the floor of the area to be cleaned and a brush driver 171a configured to generate power supplied to the brush 171b.

The brush 171b is provided at a suction inlet formed at the bottom surface of the main body 11 and scatters the foreign substances on the floor of the area to be cleaned into the suction inlet while rotating about a rotation shaft perpendicular to the front of the main body 11.

The brush driver 171a may include a brush motor and a driving circuit. The suction module 173 sucks the foreign substances scattered by the brush 171b into a dust container and may include a suction fan 173b generating a suction force for sucking the foreign substances into the dust container and a suction driver 173a configured to generate power to rotate the suction fan 173b. The suction driver 173a may include a suction motor and a driving circuit.

For example, when the cleaning mode is initiated, the controller 150 may transmit a control signal to the wheel driver 161 to travel and a control signal to the brush driver 171a and the suction driver 173a to perform cleaning.

The controller 150 may include at least one memory to store a program performing operations described above and below and at least one processor configured to execute the stored program. When the memory and the processor are provided in plural, they may be integrated into a single chip or provided in physically separate positions.

The storage unit 180 may store a control program and control data to control the operation of the cleaning robot 10 and also store the cleaning map created based on data obtained by the Lidar sensor 110. To this end, the storage unit 180 may be provided as a storage medium well known in the art.

Figure 7:
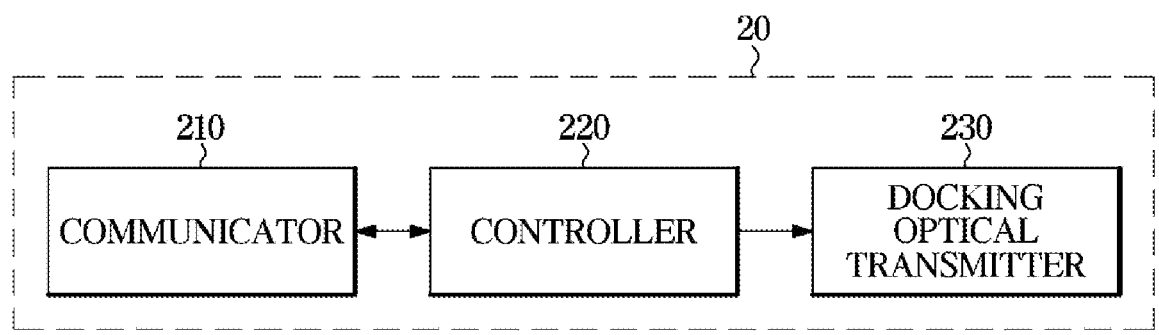
FIG. 7 is a control block diagram of a docking station according to an embodiment of the disclosure.

FIG. 7 is a control block diagram of a docking station according to an embodiment of the disclosure.

Referring to FIG. 7, the docking station 20 according to an embodiment includes a communicator 210 configured to perform communication with the cleaning robot 10, a controller 220 configured to control the operation of the docking station 20, and a docking optical transmitter 230 provided on the front surface of the main body and configured to emit light L to induce docking of the cleaning robot 10.

According to an embodiment of the disclosure, the communicator 210 may receive a message requesting for turning on the docking optical transmitter 230 from the cleaning robot 10. To this end, the communicator 210 may be provided as a wireless communication module that transmits/receives data via well-known wireless communication protocols.

Upon occurrence of a docking event, the controller 220 may initiate the docking mode to turn on the docking optical transmitter 230.

For example, upon receiving a message requesting for turning on the docking optical transmitter 230 from the communicator 210, the controller 220 may initiate supplying power to the docking optical transmitters 230.

In addition, when an event of receiving a docking instruction from an input unit (e.g., remote control) via the communicator 210, an event of elapsing a preset time after initiation of the cleaning mode in which the cleaning robot 10 performs cleaning while traveling, or the like occurs, the controller 220 may initiate supplying powder to the docking optical transmitter 230.

In addition, according to an embodiment of the disclosure, the docking station 20 may further include an optical receiver (not shown), and the controller 220 may initiate supplying power to the docking optical transmitter 230 when light emitted from the Lidar optical transmitter 111 of the cleaning robot 10 is not detected over a preset time.

Upon completion of docking of the cleaning robot 10 as the docking terminal 130 of the cleaning robot 10 is connected to the charging terminal 25, the controller 220 may initiate supplying power to the cleaning robot 10 via the charging terminal 25.

The controller 220 may include at least one memory to store a program performing operations described above and below and at least one processor configured to execute the stored program. When the memory and the processor are provided in plural, they may be integrated into a single chip or provided in physically separate positions.

The docking optical transmitters 230 may emit light L under the control of the controller 220. For example, the docking optical transmitters 230 may be provided on the front surface of the main body of the docking station 20 and emit light L in the forward direction from the front surface of the main body of the docking station 20 when the cleaning robot 10 initiates the docking mode. The cleaning robot 10 may be docked on the docking station 20 by detecting the light L emitted from the docking optical transmitters 230 and moving toward the front surface of the main body of the docking station 20. As such, the docking optical transmitter 230 may induce docking of the cleaning robot 10 by emitting light L.

The control flows of the cleaning robot 10 and the docking station 20 have been described above. Hereinafter, operation of performing docking of the cleaning robot 10 with the docking station 20 by initiating the docking mode will be described below.

FIG. 8 is a diagram for describing a docking mode in which a cleaning robot performs docking by receiving light emitted from a docking station according to an embodiment of the disclosure.

Referring to FIG. 8, the controller 150 of the cleaning robot 10 may initiate the docking mode upon occurrence of a docking event. For example, the docking event may include an even in which a charge amount of the battery of the cleaning robot 10 decreases below a preset value, an event in which a docking instruction is input from a user via an input unit (e.g., remote control or input button provided at the main body 11), an event in which a preset time elapses after initiation of a cleaning mode in which the cleaning robot 10 performs cleaning while traveling, and the like.

Upon initiation of the docking mode according to an embodiment of the disclosure, the controller 150 may control the communicator 140 to transmit a message requesting for turning on the docking optical transmitter 230 to the docking station 20. However, when the docking station 20 identifies the docking event and the docking optical transmitter 230 is automatically turned on according to an embodiment of the disclosure, the process of transmitting the request message to the docking station 20 may be omitted.

The cleaning robot 10 may perform docking in one docking mode selected from a first docking mode in which the docking is performed based on light L received by the docking optical receiver 120 and a second docking mode in which the docking is performed based on light L received by the Lidar optical receiver 113 of the Lidar sensor 110 according to an embodiment.

Upon initiation of the first docking mode, the controller 150 may control the drive unit 160 to be docked on the docking station 20 based on light received by the docking optical receiver 120 from the docking station 20.

For example, when docking is performed in the first docking mode, the controller 150 may turn on the docking optical receiver 120. In this case, the Lidar sensor 110 may be turned on or off.

In this regard, the docking optical receiver 120 may receive light having a bandwidth different from that of the Lidar optical receiver 113 of the Lidar sensor 110 to distinguish reflected light of the Lidar sensor 110 from the light L from the docking optical transmitter 230 of the docking station 20.

For example, the bandwidth of light that is emitted and received between the Lidar optical transmitter 111 and the Lidar optical receiver 113 may be allocated to be different from the bandwidth of light that is emitted and received between the docking optical transmitter 230 of the docking station 20 and the docking optical receiver 120 of the cleaning robot 10.

Meanwhile, when the cleaning robot 10 performs docking in the second docking mode according to another embodiment of the disclosure, the docking may be performed based on light received by the Lidar optical receiver 113 of the Lidar sensor 110 without using the docking optical receiver 120. In this case, the cleaning robot 10 may or may not include the docking optical receiver 120 and may receive light emitted from the docking optical transmitter 230 by turning on only the Lidar optical receiver 113 in a state where the Lidar optical transmitter 111 is turned off.

For example, when the cleaning robot 10 does not include the docking optical receiver 120 and the second docking mode is initiated according to an embodiment of the disclosure, the cleaning robot 10 may detect light L emitted from the docking optical transmitter 230 of the docking station 20 via the Lidar optical receiver 113 by turning off the Lidar optical transmitter 111 and turning on the Lidar optical receiver 113.

In addition, when the cleaning robot 10 includes the docking optical receiver 120 and the second docking mode is initiated according to an embodiment of the disclosure, the cleaning robot 10 may detect light L emitted from the docking optical transmitter 230 of the docking station 20 via the Lidar optical receiver 113 by turning off the Lidar optical transmitter 111 and turning on the Lidar optical receiver 113 simultaneously turning off the docking optical receiver 120.

As described above, because the cleaning robot 10 performs docking using the Lidar sensor 110, there is no need for light receiving sensors for receiving light emitted from the docking station 20.

Specifically, cleaning robots of the related art need to include a plurality of light receiving sensors provided at different directions to receive light emitted from a docking station. For example, the cleaning robots should include a plurality of light receiving sensors oriented in different directions to receive light to identify the direction toward the docking station.

The cleaning robot 10 of the disclosure does not need to include a plurality of light receiving sensors because light emitted from the docking station 20 is received using the Lidar sensor 110. For example, because the cleaning robot 10 may identify the position of light emitted from the docking station 20 by using the docking optical receiver 120 provided at the Lidar sensor 110 and rotating together with the Lidar optical receiver 113 of the Lidar sensor 110 (first docking mode) or using the Lidar optical receiver 113 of the Lidar sensor 110 (second docking mode), there is no need for a plurality of light receiving sensors oriented in different directions to receive light.

Therefore, the cleaning robot 10 of the disclosure may reduce costs for materials used to form the light receiving sensors and lower energy consumption resulting from the operation of the light receiving sensors.

The docking mode of the cleaning robot 10 has been described above. Hereinafter, a docking operation of the cleaning robot 10 with the docking station 20 by initiating the docking mode will be described below. Because the first docking mode is different from the second docking mode only in the device receiving light L emitted from the docking optical transmitter 230 of the docking station 20 and the other configuration for performing docking by treating the received light L are the same, hereinafter, the embodiment will be described based on the optical receivers 113 and 120 which may correspond to the docking optical receiver 120 and the Lidar optical receiver 113, respectively.

Figure 9:
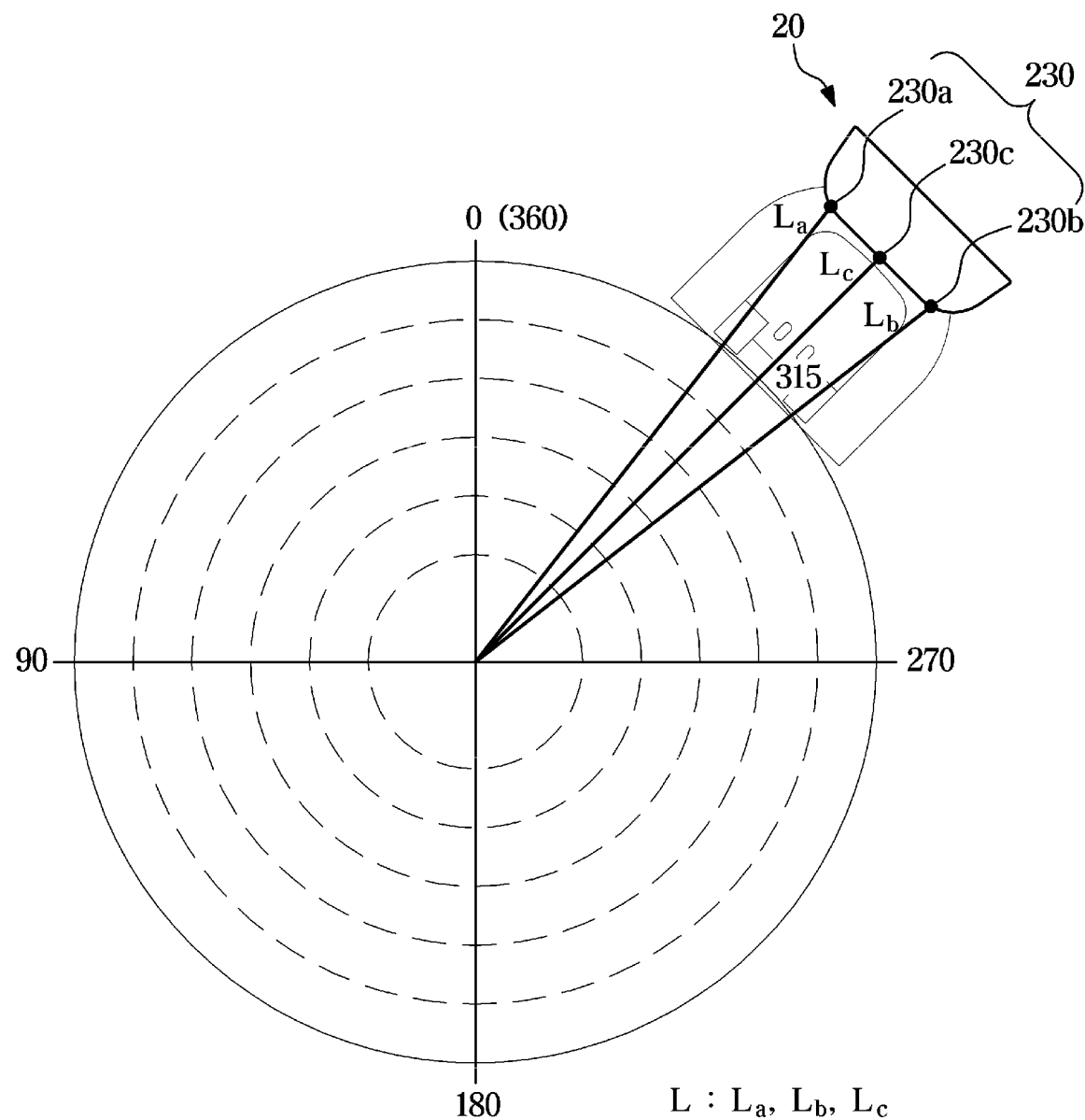
FIG. 9 is a diagram illustrating an operation of detecting a position of a docking station performed by a cleaning robot according to an embodiment of the disclosure.
Figure 10:
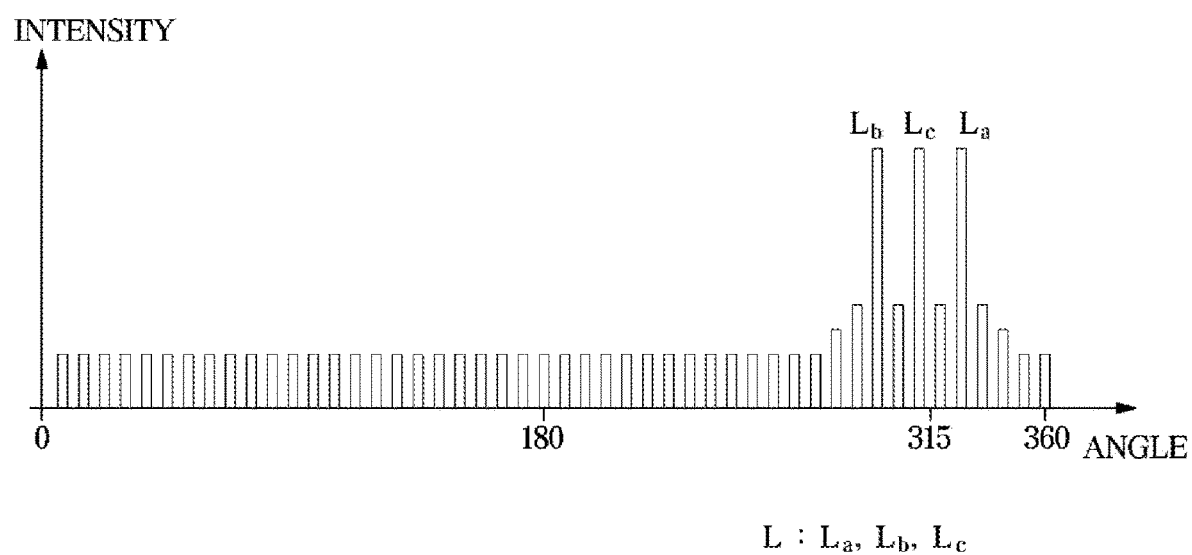
FIG. 10 is a diagram illustrating output information of an optical receiver of a cleaning robot according to an embodiment of the disclosure.
Figure 11:
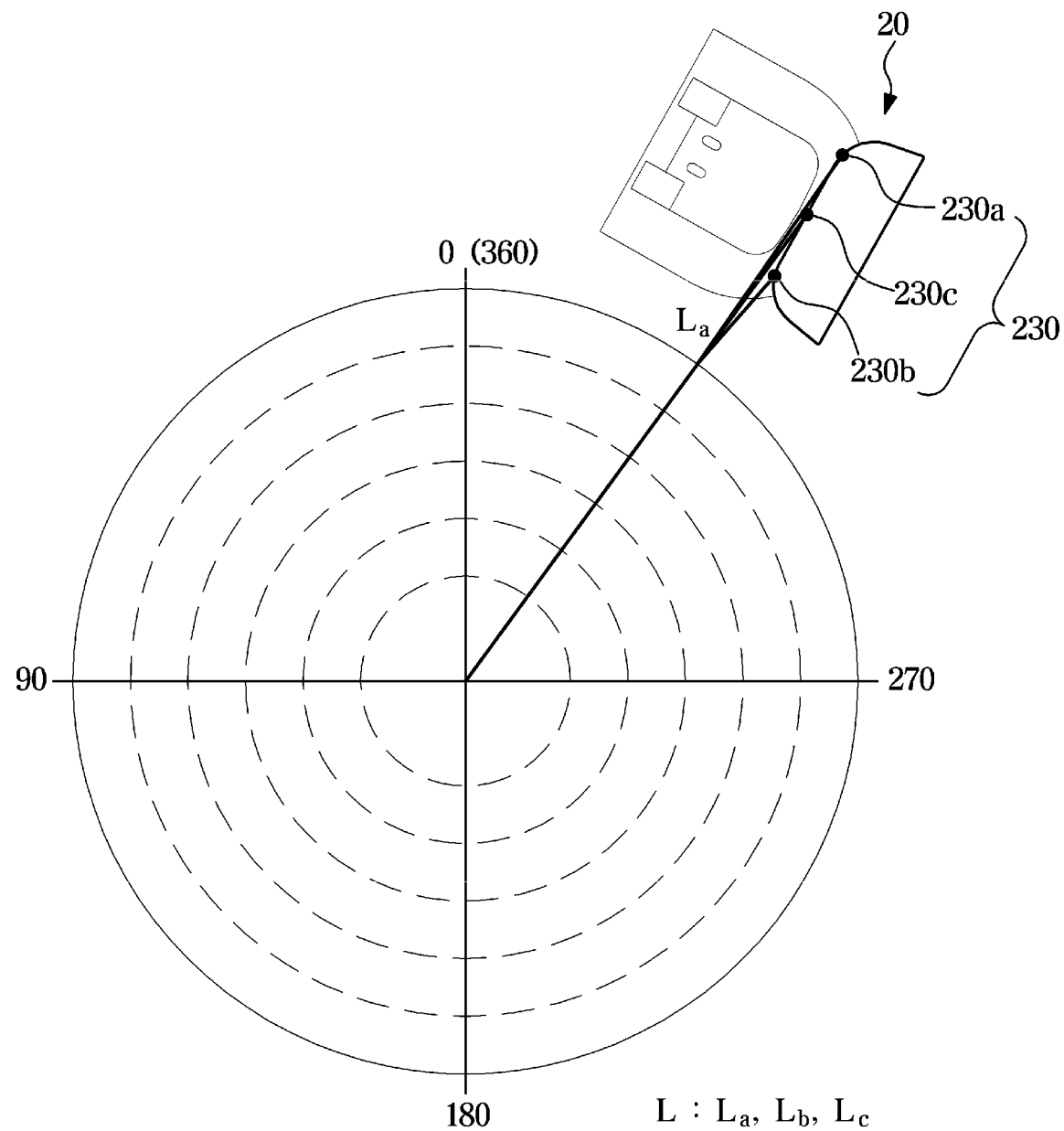
FIG. 11 is a diagram for describing a case of identify a number of docking optical transmitters of a docking station as one performed by a cleaning robot according to an embodiment of the disclosure.
Figure 12:
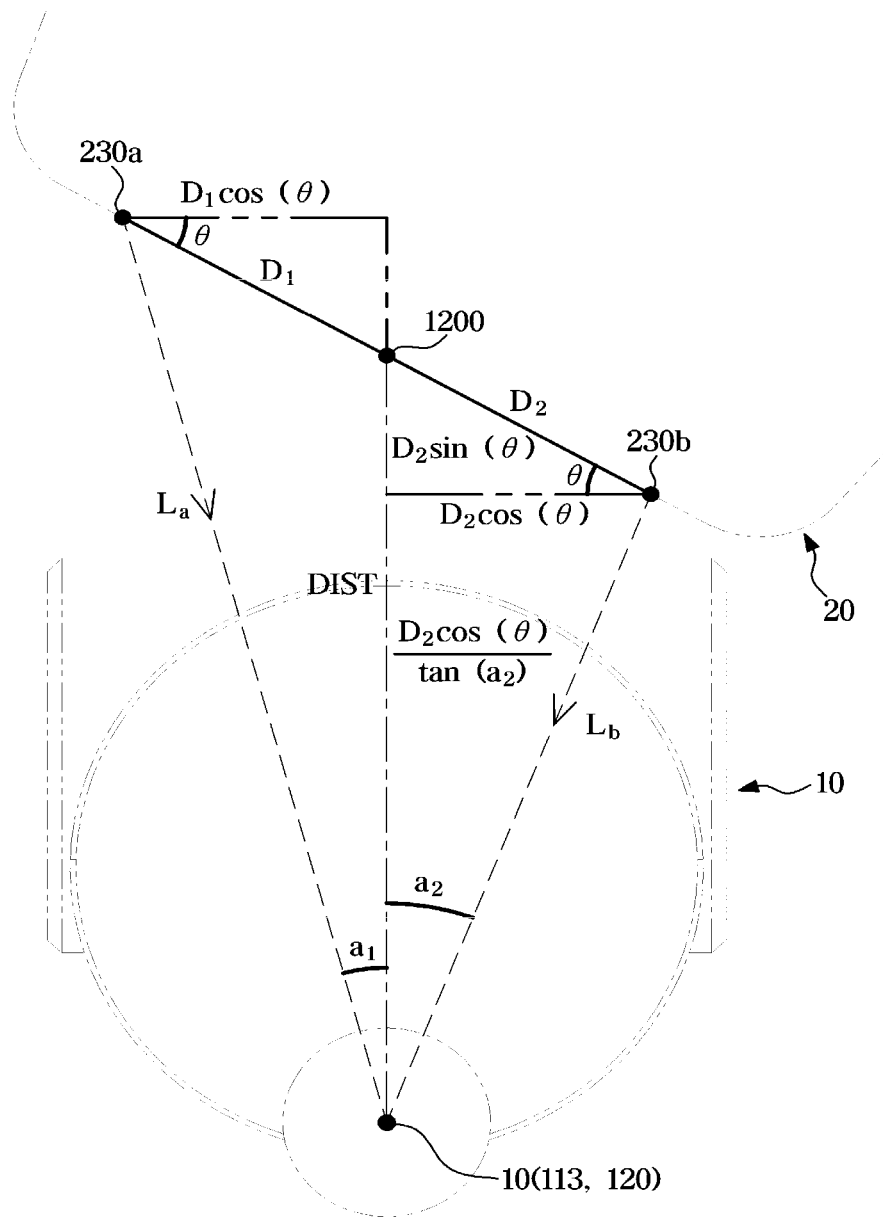
FIG. 12 is a diagram for describing a case of determining a distance from and an angle with a docking station performed by a cleaning robot according to an embodiment of the disclosure.

FIG. 9 is a diagram illustrating an operation of detecting a position of a docking station performed by a cleaning robot according to an embodiment of the disclosure. FIG. 10 is a diagram illustrating output information of an optical receiver of a cleaning robot according to an embodiment of the disclosure. FIG. 11 is a diagram for describing a case of identify a number of a docking optical transmitters of a docking station as one performed by a cleaning robot according to an embodiment of the disclosure. FIG. 12 is a diagram for describing a case of determining a distance from and an angle with a docking station performed by a cleaning robot according to an embodiment of the disclosure.

Referring to FIGS. 9 and 10, when the docking mode is initiated, the cleaning robot 10 may perform docking with the docking station 20 by receiving light L emitted from the docking optical transmitter 230 via the optical receiver 113 or 120.

For example, referring to FIG. 9, the docking station 20 may be located at a position 315° counterclockwise from the forward direction (0°) of the cleaning robot 10. In this case, the optical receiver 113 or 120 may transmit output information indicating that an intensity of the received light in a direction (e.g., 315°) where the docking station 20 is located is higher than those of the other directions as shown in FIG. 10, to the controller 150. Here, the reference angle (0°) may correspond to the forward direction of the cleaning robot 10, and the controller 150 may identify the direction where the light L is received by identifying a rotation direction of the optical receiver 113 or 120 based on an output of an encoder of the rotation drive unit 115.

The controller 150 may identify the direction where the docking station 20 is located based on the output information of the optical receiver 113 or 120. For example, the controller 150 may determine that the docking station 20 is located in the direction (e.g., 315°) where the intensity of light is higher based on the output information of the optical receiver 113 or 120.

In addition, the controller 150 may determine angles between each of the plurality of docking optical transmitters 230 and the optical receiver 113 or 120 based on light L emitted from the plurality of docking optical transmitters 230.

For example, referring to FIG. 9, the docking optical transmitters 230 may include a first docking optical transmitter 230a configured to emit first light La, a second docking optical transmitter 230b configured to emit second light Lb, and a third docking optical transmitter 230c configured to emit third light Lc.

In this case, referring to FIG. 10, the controller 150 may identify angles at which the first light La, the second light Lb, and the third light Lc are received based on output information of the optical receiver 113 or 120 and determine distances between each of the plurality of docking optical transmitters 230a, 230b, and 230c and the optical receiver 113 or 120 based on the angles at which the first light La, the second light Lb, and the third light Lc are received.

In other words, the controller 150 may determine the angle between the optical receiver 113 or 120 and the first docking optical transmitter 230a, the angle between the optical receiver 113 or 120 and the second docking optical transmitter 230b, and the angle between the optical receiver 113 or 120 and the third docking optical transmitter 230c based on output information of the optical receiver 113 or 120.

Meanwhile, referring to FIG. 11, the cleaning robot 10 may identify the number of the docking optical transmitters 230 as one when light L is received from only one docking optical transmitter 230 due to a relative position with the docking station 20 or when light L received from a plurality of docking optical transmitters 230 is not distinguished from each other due to a relative position with the docking station 20 and a resolution of the optical receiver 113 or 120.

For example, when the cleaning robot 10 travels not toward the front surface of the docking station 20 but toward a side surface thereof as shown in FIG. 11, the docking optical transmitters 230 may be identified as one device. For example, the optical receiver 113 or 120 may receive only the light Lb emitted from the second docking optical transmitter 230b located in the direction where the cleaning robot 10 is located or may identify light La, Lb, and Lc emitted from the plurality of docking optical transmitters 230a, 230b, and 230c as light emitted from one position. In other words, the optical receiver 113 or 120 may transmit output information indicating that a peak intensity is obtained at only one angle, to the controller 150 in a way different from that illustrated in FIG. 10.

In this case, because the cleaning robot 10 cannot identify the respective distances between the plurality of optical transmitters 230 and the optical receiver 113 or 120 but identifies that the docking station 20 is located in a direction where the identified docking optical transmitter 230 is located, the distance and the angle between the cleaning robot 10 and the docking station 20 cannot be accurately identified.

In other words, the fact that only one docking optical transmitter 230 is identified indicates that the cleaning robot 10 is too far from the docking station 20 for docking or the angle therebetween is not suitable for docking. Thus, the cleaning robot 10 may continue traveling in a direction toward the identified docking optical transmitter 230 until the number of the identified docking optical transmitters 230 becomes plural to be located in front of the docking station 20 to identify the plurality of docking optical transmitters 230.

Specifically, the controller 150 may determine the number of identified docking optical transmitters 230 among the plurality of docking optical transmitters 230 of the docking station 20 based on light emitted from the docking optical transmitters 230 and received by the optical receiver 113 or 120 and control the drive unit 160 based on the determined number of the docking optical transmitters 230.

For example, when the determined number of docking optical transmitters 230 is one, the controller 150 may control the drive unit 160 to travel in a direction toward the identified docking optical transmitter 230 until the number of the identified docking optical transmitters 230 become plural.

As described above, the cleaning robot 10 may identify the docking station 20 and travel toward the docking station 20 even when the docking station 20 is located at a distant position therefrom, by determining the number of identified docking optical transmitters 230 based on light received by the optical receiver 113 or 120 from the docking optical transmitters 230 among the plurality of docking optical transmitters 230 of the docking station 20.

Referring to FIG. 12, when the determined number of the docking optical transmitters 230 is plural, the cleaning robot 10 may determine a distance DIST and an angle θ between the cleaning robot 10 and the docking station 20 based on angles between the optical receiver 113 or 120 and each of the plurality of docking optical transmitters 230 and control the drive unit 160 to be docked on the docking station 20 based on the determined distance DIST and angle θ.

For example, when the docking station 20 includes two docking optical transmitters 230a and 230b, the controller 150 may identify the plurality of docking optical transmitters 230a and 230b and determine angles a1 and a2 between the optical receiver 113 or 120 and the plurality of docking optical transmitters 230.

For example, the controller 150 may determine the angle a1 between the optical receiver 113 or 120 and the first docking optical transmitter 230a and the angle a2 between the optical receiver 113 or 120 and the second docking optical transmitter 230b by determining angles at which first light La emitted from the first docking optical transmitter 230a and second light Lb emitted from the second docking optical transmitter 230b are received based on output information of the optical receiver 113 or 120.

The controller 150 may determine the distance DIST and the angle θ between the cleaning robot 10 and the docking station 20 based on the angles a1 and a2 between the optical receiver 113 or 120 and each of the plurality of docking optical transmitters 230 and distances D1 and D2 between a docking position 1200 of the docking station 20 and each of the plurality of docking optical transmitters 230. In this regard, the docking position 1200 is a position where the cleaning robot 10 is to be located and docked enabling connection between the docking terminal 130 of the cleaning robot 10 and the charging terminal 25 of the docking station 20. In addition, the distance D1 between the first docking optical transmitter 230a and the docking position 1200 and the distance D2 between the second docking optical transmitter 230b and the docking position 1200 may correspond to preset values in a designing stage and may be stored in the storage unit 180 of the cleaning robot 10.

Specifically, the controller 150 may determine the angle θ between the cleaning robot 10 and the docking station 20 according to Equation 1 below.

$$\tan\theta = \frac{D1 - \tan a1 \cdot \frac{D2}{\tan a2}}{(D1 + D2) \cdot \tan a1} \qquad \text{Equation 1}$$

Here, θ may be the angle between the cleaning robot 10 and the docking station 20 and correspond to an angle between an axis parallel to the front surface of the cleaning robot 10 and an axis parallel to the front surface of the docking station 20. For example, when the front surfaces of the cleaning robot 10 and the docking station 20 face each other, the angle θ may be 0. In addition, the distance D1 corresponds to a distance between the first optical transmitter 230a and the docking position 1200 and the distance D2 corresponds to a distance between the second optical transmitter 230b and the docking position 1200. In addition, the angle a1 corresponds to an angle between the first optical transmitter 230a and the optical receiver 113 or 120 and the angle a2 corresponds to an angle between the second optical transmitter 230b and the optical receiver 113 or 120.

In addition, the controller 150 may determine the distance DIST between the cleaning robot 10 and the docking station 20 according to Equation 2 below.

$$DIST = \frac{D2 \cdot \cos\theta}{\tan a2} + D2 \cdot \sin\theta \qquad \text{Equation 2}$$

In this case, the distance DIST may correspond to a distance between the cleaning robot 10 and the docking station 20 and the angle θ may correspond to an angle between the cleaning robot 10 and the docking station 20. In addition, the distance D2 corresponds to a distance between the second optical transmitter 230b and the docking position 1200, and the angle a2 corresponds to an angle between the second optical transmitter 230b and the optical receiver 113 or 120.

For example, the controller 150 may continue traveling in the direction where the identified docking optical transmitter 230 is located until a plurality of docking optical transmitters 230 are identified to determine the distance and the angle between the cleaning robot 10 and the docking station 20.

In addition, the controller 150 continuously moves the main body 11 by controlling the drive unit 160 until the angle θ between the cleaning robot 10 and the docking station 20 becomes 0 and the distance DIST between the cleaning robot 10 and the docking station 20 becomes less than a preset distance so that the cleaning robot 10 is docked on the docking station 20.

In this regard, when the docking terminal 130 of the cleaning robot 10 is connected to the charging terminal 25 of the docking station 20, the controller 150 may control the drive unit 160 to stop traveling. For example, upon confirming that power is supplied from the sensor of the docking terminal 130, the cleaning robot 10 may determine that docking is completed and stop the operation of the drive unit 160.

Meanwhile, when the docking optical transmitter 230 is not identified by the optical receiver 113 or 120, the controller 150 may control the drive unit 160 to travel the position of the docking station 20 on the cleaning map until the docking optical transmitter 230 is identified.

For example, the cleaning robot 10 may store the cleaning map and mark the position of the docking station 20 on the cleaning map when the cleaning robot 10 leaves from the docking station 20. When the cleaning robot 10 cannot identify light L emitted from the front surface of the docking station 20 due to a distance from or an angle with the docking station 20, the cleaning robot 10 may travel to the position of the docking station 20 on the cleaning map first so as to move to the front surface of the docking station 20 to identify the light L. Therefore, the cleaning robot 10 may be docked on the docking station 20 accurately even when the cleaning robot 10 is located at a distant position from the docking station 20.

Hereinafter, a method of controlling the cleaning robot 10 according to an embodiment will be described. In the method of controlling the cleaning robot 10, the cleaning robot 10 according to the previous embodiment may be used. Therefore, descriptions given above with reference to FIGS. 1 to 12 may be applied to the method of controlling the cleaning robot 10 in the same manner.

Figure 13:
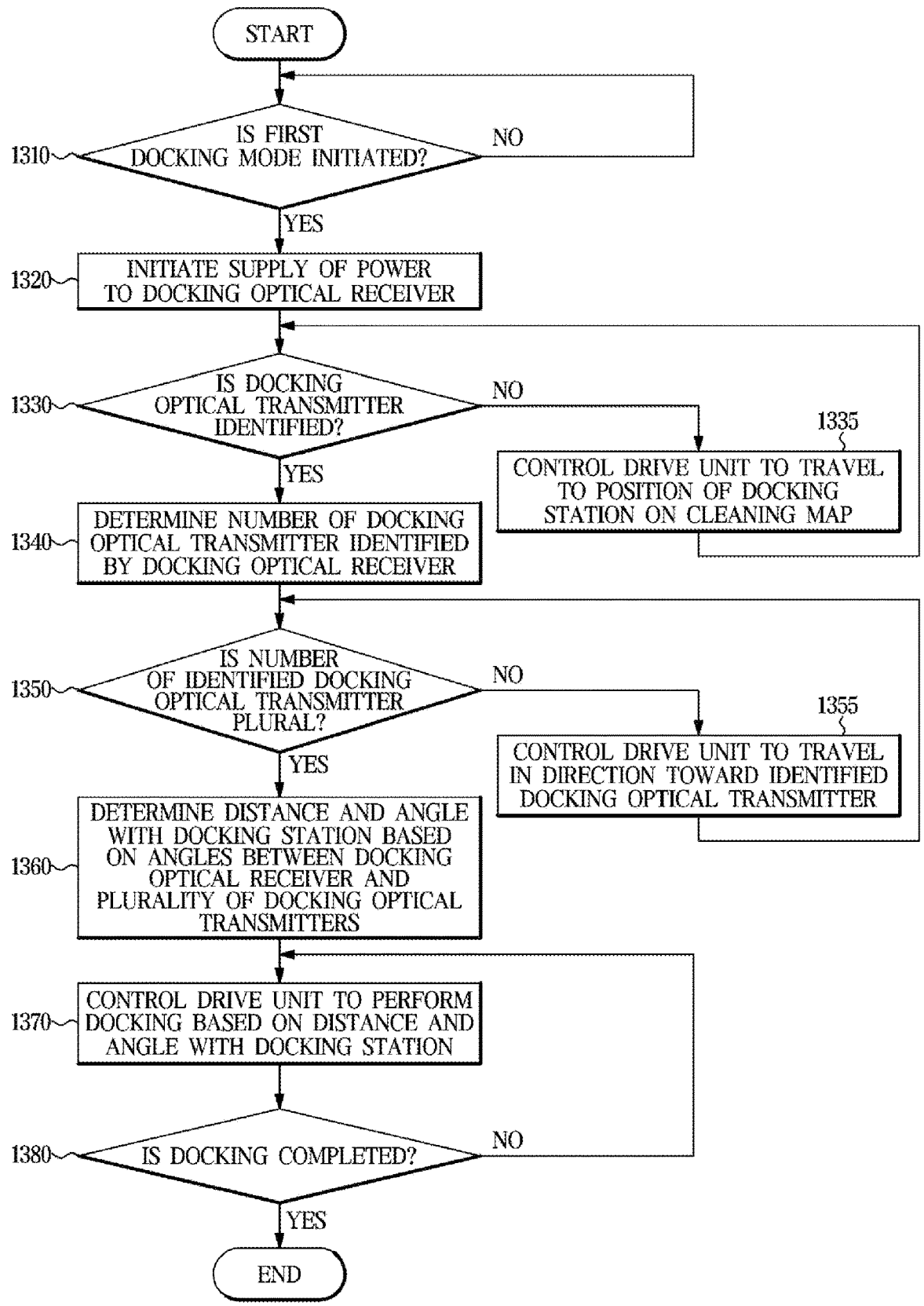
FIG. 13 is a flowchart showing docking performed in a first docking mode in a method of controlling a cleaning robot according to an embodiment of the disclosure.

FIG. 13 is a flowchart showing docking performed in a first docking mode in a method of controlling a cleaning robot according to an embodiment of the disclosure.

Referring to FIG. 13, when the first docking mode is initiated (Yes of operation 1310), the cleaning robot 10 according to an embodiment may initiate supplying power to the docking optical receiver 120 at operation 1320.

The docking optical receiver 120 may detect light L emitted from the docking optical transmitter 230 of the docking station 20, and the cleaning robot 10 may identify the docking optical transmitter 230 based on output information of the docking optical receiver 120.

In this regard, when the cleaning robot 10 cannot identify the docking optical transmitter 230 (No of operation 1330), the cleaning robot 10 may control the drive unit 160 to travel to the position of the docking station 20 on the cleaning map at operation 1335.

For example, the cleaning robot 10 may store the cleaning map and mark the position of the docking station 20 on the cleaning map when the cleaning robot 10 leaves from the docking station 20. When the cleaning robot 10 cannot identify light L emitted from the front surface of the docking station 20 due to a distance from or an angle with the docking station 20, the cleaning robot 10 may travel to the position of the docking station 20 on the cleaning map first so as to move to the front surface of the docking station 20 to identify the light L. Therefore, the cleaning robot 10 may be docked on the docking station 20 accurately even when the cleaning robot 10 is located at a distant position from the docking station 20.

When the cleaning robot 10 identifies the docking optical transmitters 230 (Yes of operation 1330), the cleaning robot 10 may determine the number of docking optical transmitters 230 identified by the docking optical receiver 120 at operation 1340.

When the number of identified docking optical transmitters 230 is not plural (No of operation 1350), the cleaning robot 10 may control the drive unit 160 to travel in a direction toward the identified docking optical transmitter 230 at operation 1355.

When light L is received from only one docking optical transmitter 230 due to a relative position with the docking station 20 or when light L received from a plurality of docking optical transmitters 230 is not distinguished due to a relative position with the docking station 20 and a resolution of the optical receiver 113 or 120, the cleaning robot 10 may identify the number of the docking optical transmitters 230 as one.

In this case, because the cleaning robot 10 cannot identify the respective distances between the plurality of optical transmitters 230 and the optical receiver 113 or 120 but identifies that the docking station 20 is located in a direction where the identified docking optical transmitter 230 is located, the distance and the angle between the cleaning robot 10 and the docking station 20 cannot be accurately identified.

In other words, the fact that only one docking optical transmitter 230 is identified indicates that the cleaning robot 10 is too far from the docking station 20 for docking or the angle therebetween is not suitable for docking. Thus, the cleaning robot 10 may continue traveling in a direction toward the identified docking optical transmitter 230 until the number of the identified docking optical transmitters 230 becomes plural to be located in front of the docking station 20 to identify the plurality of docking optical transmitters 230.

When the number of identified docking optical transmitters 230 is plural (Yes of operation 1350), the cleaning robot 10 may determine the distance and the angle between the docking optical receiver 120 and the plurality of optical transmitters 230 at operation 1360 and control the drive unit 160 to perform docking based on the distance from and the angle with the docking station 20 at operation 1370 until the docking is completed (Yes of operation 1380).

For example, the controller 150 may proceed traveling in a direction where the identified docking optical transmitter 230 is located until a plurality of docking optical transmitters 230 are identified to determine the distance and the angle between the cleaning robot 10 and the docking station 20.

In addition, the controller 150 continuously moves the main body 11 by controlling the drive unit 160 until the angle θ between the cleaning robot 10 and the docking station 20 becomes 0 and the distance DIST between the cleaning robot 10 and the docking station 20 becomes less than a preset distance so that the cleaning robot 10 is docked on the docking station 20.

In this regard, when the docking terminal 130 of the cleaning robot 10 is connected to the charging terminal 25 of the docking station 20, the controller 150 may control the drive unit 160 to stop traveling. For example, upon confirming that power is supplied from the sensor of the docking terminal 130, the cleaning robot 10 may determine that docking is completed and stop the operation of the drive unit 160.

Figure 14:
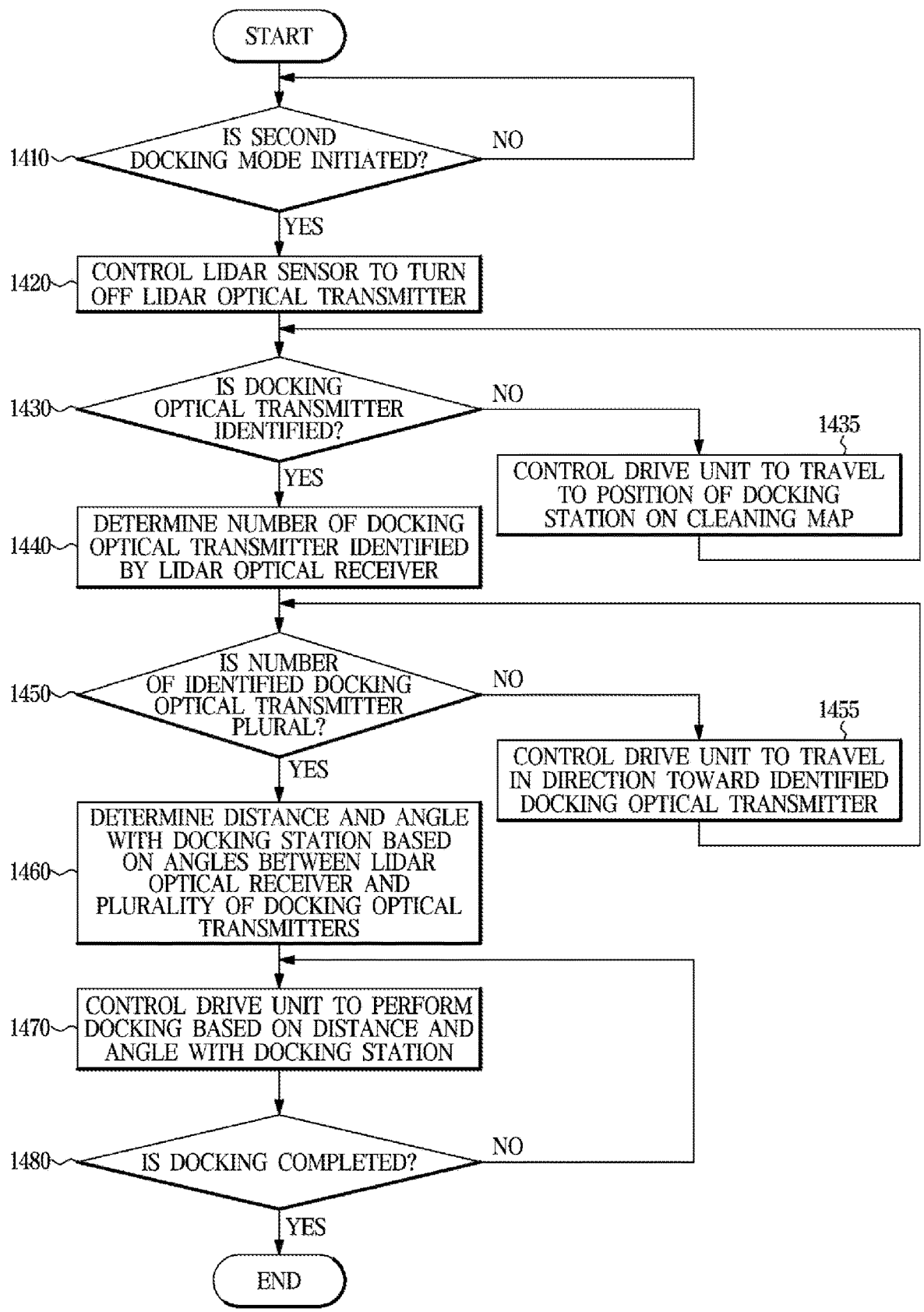
FIG. 14 is a flowchart showing docking performed in a second docking mode in a method of controlling a cleaning robot according to an embodiment of the disclosure.

FIG. 14 is a flowchart showing docking performed in a second docking mode in a method of controlling a cleaning robot according to an embodiment of the disclosure.

Referring to FIG. 14, when the second docking mode is initiated (Yes of operation 1410), the cleaning robot 10 may control the Lidar sensor 110 to turn off the Lidar optical transmitter 111 at operation 1420.

In this case, the Lidar optical receiver 113 may detect light L emitted from the docking optical transmitter 230 of the docking station 20, and the cleaning robot 10 may identify the docking optical transmitter 230 based on output information of the Lidar optical receiver 113.

Operations 1430 to 1480 correspond to operations 1330 to 1380 except that light L emitted from the docking optical transmitter 230 is received by the Lidar optical receiver 113, and thus descriptions thereof given above will be omitted.

Meanwhile, the aforementioned embodiments may be embodied in the form of a recording medium storing instructions executable by a computer. The instructions may be stored in the form of program codes and perform the operation of the disclosed embodiments by creating a program module when executed by a processor. The recording medium may be embodied as a computer readable recording medium.

The computer readable recording medium includes all types of recording media that store instructions readable by a computer, such as a read only memory (ROM), a random access memory (RAM), a magnetic tape, a magnetic disc, a flash memory, and an optical data storage device.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A cleaning robot comprising:
 a main body;
 a drive unit configured to move the main body;
 a Lidar sensor comprising:
  a Lidar optical transmitter,
  a Lidar optical receiver, and
  a printed circuit board (PCB) to which the Lidar optical transmitter and the Lidar optical receiver are fixed and provided to be rotatable;
 a docking optical receiver fixed to the PCB and configured to receive light emitted from a docking optical transmitter of a docking station; and
 at least one processor configured to control the drive unit to be docked on the docking station based on light received by the docking optical receiver.

2. The cleaning robot of claim 1, wherein the docking optical receiver receives light having a bandwidth different from that of the Lidar optical receiver of the Lidar sensor.

3. The cleaning robot of claim 1, wherein the docking optical receiver is provided on one surface of the PCB opposite to another surface on which the Lidar optical transmitter and the Lidar optical receiver are provided.

4. The cleaning robot of claim 1, wherein the at least one processor is further configured to:
 determine a number of identified docking optical transmitters among a plurality of docking optical transmitters of the docking station based on light received by the docking optical receiver, and
 control the drive unit based on the determined number of docking optical transmitters.

5. The cleaning robot of claim 4, wherein, in response to the determined number of the docking optical transmitters being one, the at least one processor is further configured to control the drive unit to travel in a direction toward the identified docking optical transmitter until the number of the identified docking optical transmitters becomes plural.

6. The cleaning robot of claim 4, wherein, in response to the determined number of the docking optical transmitters being plural, the at least one processor is further configured to:
 determine a distance and an angle between the cleaning robot and the docking station based on angles between the docking optical receiver and the plurality of docking optical transmitters, and
 control the drive unit to be docked on the docking station based on the determined distance and angle.

7. The cleaning robot of claim 1, wherein, in response to the docking optical transmitter not being identified by the docking optical receiver, the at least one processor is further configured to control the drive unit to travel to a position of the docking station on a cleaning map until the docking optical transmitter is identified.

8. The cleaning robot of claim 1, further comprising:
 a docking terminal connected to a charging terminal of the docking station,
 wherein the at least one processor is further configured to control the drive unit to stop traveling when the docking terminal is connected to the charging terminal.

9. The cleaning robot of claim 1, further comprising:
 a communicator configured to communicate with the docking station,
 wherein the at least one processor is further configured to control the communicator to request the docking station to allow the docking optical transmitter to emit light in response to a docking mode being initiated.

10. A cleaning robot comprising:
a main body;
a drive unit configured to move the main body;
a Lidar sensor comprising:
   a Lidar optical transmitter, and
   a Lidar optical receiver; and
at least one processor is configured to:
   control the Lidar sensor to turn off the Lidar optical transmitter, and
   control the drive unit to be docked on a docking station based on light emitted from a docking optical transmitter of the docking station and received by the Lidar optical receiver, in response to a docking mode being initiated.

11. The cleaning robot of claim 10, wherein the at least one processor is further configured to:
determine a number of the identified docking optical transmitters among a plurality of docking optical transmitters of the docking station based on light received by the Lidar optical receiver, and
control the drive unit based on the determined number of docking optical transmitters.

12. The cleaning robot of claim 11, wherein, in response to the determined number of the docking optical transmitters being one, the at least one processor is further configured to control the drive unit to travel in a direction toward the identified docking optical transmitter until the number of the identified docking optical transmitters becomes plural.

13. The cleaning robot of claim 11, wherein, in response to the determined number of the docking optical transmitters being plural, the at least one processor is further configured to:
determine a distance and an angle between the cleaning robot and the docking station based on angles between the Lidar optical receiver and the plurality of docking optical transmitters, and
control the drive unit to be docked on the docking station based on the determined distance and angle.

14. The cleaning robot of claim 10, wherein, in response to the docking optical transmitter not being identified by the Lidar optical receiver, the at least one processor is further configured to control the drive unit to travel to a position of the docking station on a cleaning map until the docking optical transmitter is identified.

15. The cleaning robot of claim 10, further comprising:
a docking terminal connected to a charging terminal of the docking station,
wherein the at least one processor is further configured to control the drive unit to stop traveling when the docking terminal is connected to the charging terminal.

16. The cleaning robot of claim 10, further comprising:
a communicator configured to communicate with the docking station,
wherein the at least one processor is further configured to control the communicator to request the docking station to allow the docking optical transmitter to emit light when a docking mode is initiated.

17. A method of controlling a cleaning robot comprising:
a main body;
a drive unit configured to move the main body; and
a Lidar sensor comprising:
   a Lidar optical transmitter,
   a Lidar optical receiver, and
   a printed circuit board (PCB) to which the Lidar optical transmitter and the Lidar optical receiver are fixed and provided to be rotatable, the method comprising:
      initiating supplying power to a docking optical receiver fixed to the PCB and configured to receive light emitted from the docking optical transmitter of the docking station in response to a docking mode being initiated, and
      controlling the drive unit to be docked on the docking station based on light received by the docking optical receiver.

18. The method of claim 17, further comprising receiving light having a bandwidth different from that of the Lidar optical receiver of the Lidar sensor.

19. The method of claim 17, further comprising:
determining a number of identified docking optical transmitters among a plurality of docking optical transmitters of the docking station based on light received by the docking optical receiver; and
controlling the drive unit based on the determined number of the docking optical transmitters.

20. The method of claim 19, further comprising:
controlling the drive unit to travel in a direction toward the identified docking optical transmitter until the number of the identified docking optical transmitters becomes plural in response to the determined number of the docking optical transmitters being one; and
controlling the drive unit to be docked on the docking station by determining a distance and an angle between the cleaning robot and the docking station based on angles between the docking optical receiver and the plurality of docking optical transmitters, in response to the determined number of the docking optical transmitters being plural.

21. The method of claim 20, further comprising providing the docking optical receiver on one surface of the PCB opposite to another surface on which the Lidar optical transmitter and the Lidar optical receiver are provided.

22. The method of claim 21, further comprising:
determining a number of identified docking optical transmitters among a plurality of docking optical transmitters of the docking station based on light received by the docking optical receiver; and
controlling the drive unit based on the determined number of docking optical transmitters.

* * * * *